United States Patent
Pauly et al.

(10) Patent No.: US 12,126,657 B2
(45) Date of Patent: Oct. 22, 2024

(54) TRAFFIC SPLITTING IN KERNEL FOR TARGETED TRAFFIC PROTECTION

(71) Applicant: Apple Inc., Cupertino, CA (US)

(72) Inventors: Thomas F. Pauly, Campbell, CA (US); Nishchaie Khanna, Mountain View, CA (US); Ahmed M. Bashir, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 339 days.

(21) Appl. No.: 17/511,150

(22) Filed: Oct. 26, 2021

(65) Prior Publication Data

US 2022/0394063 A1 Dec. 8, 2022

Related U.S. Application Data

(60) Provisional application No. 63/196,616, filed on Jun. 3, 2021.

(51) Int. Cl.
*H04L 9/40* (2022.01)
*H04L 5/00* (2006.01)
*H04L 67/141* (2022.01)

(52) U.S. Cl.
CPC .......... *H04L 63/205* (2013.01); *H04L 5/0044* (2013.01); *H04L 63/0428* (2013.01); *H04L 67/141* (2013.01)

(58) Field of Classification Search
None
See application file for complete search history.

(56) References Cited

U.S. PATENT DOCUMENTS

| | | | |
|---|---|---|---|
| 9,444,736 B2 * | 9/2016 | Pauly | H04L 45/08 |
| 10,652,281 B1 * | 5/2020 | Moolenaar | H04L 63/0236 |
| 2006/0265689 A1 * | 11/2006 | Kuznetsov | G06F 9/546 |
| | | | 717/117 |
| 2009/0319357 A1 * | 12/2009 | Flake | G06Q 30/0224 |
| | | | 705/26.1 |
| 2015/0350071 A1 * | 12/2015 | Pauly | H04L 47/803 |
| | | | 370/392 |
| 2016/0344688 A1 | 11/2016 | Lakhera et al. | |
| 2019/0075130 A1 * | 3/2019 | Petry | H04L 63/0209 |
| 2022/0050904 A1 * | 2/2022 | Sullivan | H04L 63/0428 |
| 2022/0053027 A1 * | 2/2022 | Weiss | H04L 63/20 |

* cited by examiner

*Primary Examiner* — Shanto Abedin
(74) *Attorney, Agent, or Firm* — Kilpatrick Townsend & Stockton LLP

(57) ABSTRACT

Techniques are provided for securely routing network traffic data. A kernel routine in a computing device obtains content metadata from the network traffic data associated with an application. The kernel routine can evaluate the content metadata and determine whether security and privacy policies should be applied to the network traffic data associated with the content metadata. The kernel routine can automatically create or identify tags for the content metadata based on intent and context information that is determined by the kernel routine. The tags can be associated with particular security and privacy policies, such as anonymization and encryption.

20 Claims, 13 Drawing Sheets

TRAFFIC SPLITTING IN KERNEL FOR TARGETED TRAFFIC PROTECTION

CROSS-REFERENCE TO RELATED APPLICATIONS

The application claims the benefit and priority of U.S. Provisional Application No. 63/196,616, filed Jun. 3, 2021, entitled "TRAFFIC SPLITTING IN KERNEL FOR TARGETED TRAFFIC PROTECTION," the entire contents of which is incorporated herein by reference for all purposes.

BACKGROUND

As a user accesses an application on the user's device, network data associated with the application can be transmitted from the user's device to a server associated with the application. The network data that is associated with the application can include sensitive information about the user or data that can be sensitive to tracking (e.g., advertising information, medical information, etc.). This information is often collected by a server associated with the application in order to improve application performance. However, this can also result in sensitive user information being transmitted without proper security measures.

Certain methods of protecting sensitive user information can include applying a single routing mechanism for all applications on the device (e.g., encrypting all data) or splitting the routing based on destination address (e.g., encrypting for HTTPS).

However, existing methods do not efficiently route network data to ensure data security. Further, existing methods can result in increased traffic, latency, and cost. These methods are also not flexible and cannot be easily modified or customized, making the security routing less beneficial.

SUMMARY

Embodiments provide systems, methods, and computer-readable media for securely routing network traffic data.

An example embodiment can include a method for processing network data. The method can perform a network routine (e.g., network daemon) executing in a kernel of a computing device. The computing device can include a mobile device (e.g., smart phone, tablet, etc.), wearable device (e.g., smart watch), or any other smart device. The network routine can determine how data from an application is to be routed (e.g., what policies to use) to a destination server based on properties of the data. An application can provide such data properties to the network routine. Different data destined for a same server can have different network policies, e.g., encrypted or routed through a proxy server as an intermediary.

An example embodiment can include receiving network data including a first payload and first metadata, from a first application executing on the computing device. The first metadata can include first address data specifying a destination device (e.g., application server) to which the network data is to be sent over a network and first content metadata describing first application data that triggered a first request to send the network data. The network routine determines a first policy associated with the first content metadata. The first policy specifies a first security protocol for sending the first payload to the destination device. A first network connection (e.g., socket) can be established between the first application and the destination device, for transmitting the network data that matches the first policy. The first network connection can correspond to a first security protocol (e.g., anonymizer proxy, encryption proxy, authentication required, etc.). The network routine in the kernel can route the first payload to the destination device using the first network connection.

Additionally, embodiments can include receiving, by the network routine, network data comprising a second payload and second metadata, from a second application executing on the computing device. The second metadata can include second address data specifying a second destination device (e.g., application server) to which the network data is to be sent over the network and second content metadata describing second application data that triggered a second request to send the network data. The network daemon can determine a second policy associated with the second content metadata. The second policy can specify a second security protocol (e.g., anonymizer proxy, encryption proxy, authentication required, etc.) for sending the second payload to the second destination device. A second network connection can be established for transmitting the network data that matches the second policy between the second application and the second destination device. The second network connection is configured to use the second security protocol. The second payload can be routed to the second destination device using the second network connection.

Routing policies associated with the tag information can be applied to the content metadata. The content metadata is used by the routine in the kernel to determine how each network data flow from within a single application should be routed to a destination device. Based on the metadata content, the kernel can perform a more precise routing for the network data flows. The routine in the kernel can use the metadata content to determine whether security and privacy policies should be applied. Each data flow from within a single application can be routed in accordance with its needed security measures.

Instead of the kernel merely identifying a hostname or destination address for a network data flow, the routine in the kernel can obtain metadata content from an application, or the routine in the kernel itself can identify additional metadata content about an application. An example embodiment can automatically, or with the help of applications, tag more information about the intent and content of data that is sent on a network to influence decisions about applying security policies selectively to particular flows on the system.

Accordingly, embodiments can provide the ability to be more selective when determining how to route network data flows. The network data routing is not limited to being routed based on a destination address of the network data, or solely based on the application associated with the network data. Further, example embodiments can provide a more effective method for routing sensitive user information to ensure that user information remains confidential and does not become publicly available.

Other embodiments are directed to systems, portable consumer devices, and computer readable media associated with the methods described herein.

A better understanding of the nature and advantages of exemplary embodiments may be gained with reference to the following detailed description and the accompanying drawings.

BRIEF DESCRIPTION OF THE DRAWINGS

The disclosure will be readily understood by the following detailed description in conjunction with the accompanying drawings, wherein like reference numerals designate like elements, and in which.

DETAILED DESCRIPTION

Figure 1:
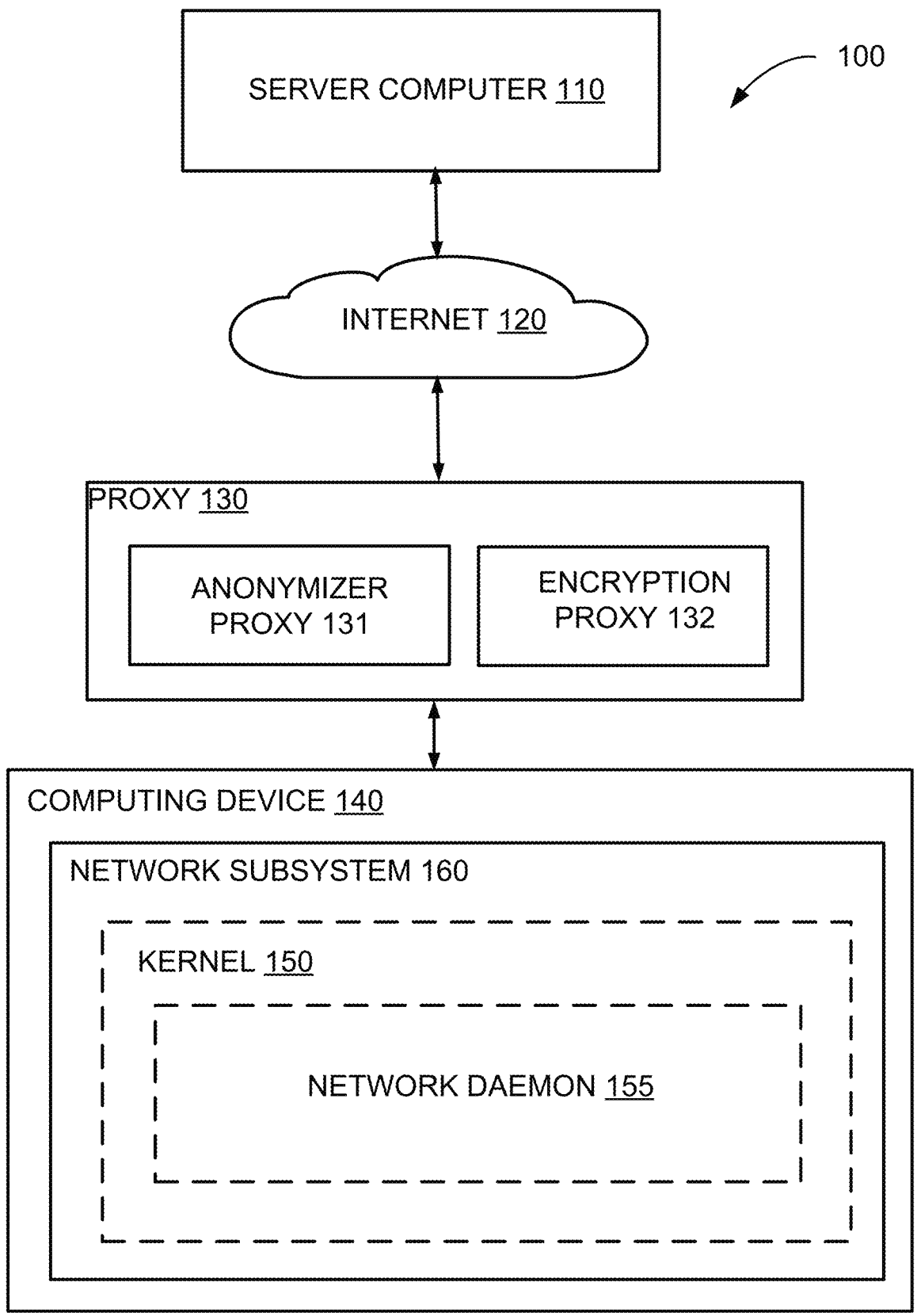
FIG. 1 illustrates a block diagram of an environment for routing network data, in accordance with some example embodiments.

Users often access applications on computing devices. Applications can include programs that enable a user to perform one or more functions on a computing device. Applications can include, for example, web browsers, e-mail programs, word processors, games, utilities, etc. Applications can include native applications (as opposed to a web browser) that can communicate over a network, usually with one or more predefined web servers.

When a user accesses an application (e.g., web browser), the user can enter an address associated with a website on the web browser (e.g., Safari). For purposes of example, an address can include a host name followed by top level domain, such as example.com. "Example" in example.com can refer to a name of a website. A website can also be referred to as a webpage. When a user accesses a website, the main content (e.g., news content, social media content, etc.) as well as secondary content (e.g., advertisements, suggested articles, etc.) may appear. The main content and secondary content can appear as a plurality of different user interface elements on a display. Each user interface element can be associated with web content. Web content can also be referred to as network data or network traffic, which can be sent or received by a device. Web content can include main web page information and secondary information, such as advertising information, related article information, etc.

Each of these different types of web content can contain and obtain various types of information about the user (e.g., browsing history, medical information, shopping history, etc.). For example, the main web content can contain information regarding the website that was accessed by the user. Whenever a user accesses a main page for a website, information regarding the websites visited by the user can be obtained. A sidebar containing advertising content can obtain information regarding advertisements selected by the user.

This information is beneficial in enhancing the web content that is provided to the user. However, some of this information may include sensitive information, and it can be desired to protect this information from being disclosed or from becoming publicly available. However, in protecting the user's information, all of the web content does not need to be routed the same way. Some web content may be more sensitive than other data. Further, some web content data may not be sensitive at all.

In example embodiments, a kernel routine is provided that can selectively determine how to route sensitive network traffic data. The kernel routine can categorize the network traffic based on the type of security and/or privacy protections that should be applied to the network traffic.

Although examples are described on a per flow basis, network data that is routed by the kernel can be on a per packet or per connection basis.

Example embodiments provide a more precise and secure routing of network traffic data. Further, example embodiments can minimize the risk of activities associated with accessing applications on the Internet. Example embodiments can also prevent the user's identity from being stolen. In addition, an example embodiment can protect a user's search history from public disclosure.

I. Network Traffic Data Routing System

When a user accesses a website through a browser application (e.g., Safari), several data flows can be established for the various types of web content appearing for the website. A data flow can be established for the main page or main content, and data flows can be established for secondary content. Each of the data flows can be associated with a different security policy and routed according to their security policy via a respective connection.

A. Overview

FIG. 1 illustrates a block diagram of an environment 100 for routing network data, in accordance with some example embodiments. The environment 100 includes a server computer 110, the Internet 120, proxy 130, and computing device 140.

The server computer 110 can be a server device that is external to the computing device 140. The server computer 110 can be referred to as a destination device. The server computer 110 can host one or more applications that are accessible by the user on the computing device 140. Although a single server device is shown, the environment can include a plurality of different servers hosting different applications. When a user accesses an application on the user's device, the network data is routed from the user's device to the server computer.

Proxy 130 can perform one or more proxy functions. A proxy can ensure network security by monitoring outgoing network traffic. The proxy can protect a user's personal information. Personal information can include a user's name, social security number, medical information, IP address of their computing device, their web browsing history, advertisements of the user has selected, etc. Therese are merely examples of personal information that is gathered, and there are various types of data that may be gathered about the user.

The proxy 130 can determine whether to allow data packets to pass through based on security policies or rules. Proxy 130 can include a plurality of different proxy servers, such as an anonymizing proxy 131 and an encryption proxy 132. An anonymizing proxy 131 can be used to make activity on the Internet untraceable. The anonymizer proxy can add a layer of security between the client device and the Internet. The anonymizing proxy can include an HTTP connect proxy.

An encryption proxy 132 can encode data so that only authorized users can decrypt the data. The encryption proxy 132 prevent user information from being exposed.

One or more proxy functions can be applied to network data. For example, the anonymizer proxy 131 can include a plurality of proxies. When network data is routed through the proxy 130, a double proxy can be performed. A double proxy can include a first proxy which knows the source of the traffic and a second proxy which knows where the traffic is intended to go, but does not know the source of the traffic. Therefore, the traffic data can be processed by two proxies before proceeding to the Internet 120.

Network data may go through a plurality of proxies in order to ensure that the user's data remains anonymous and unknown to other users or networks. Therefore, unlike a VPN, information about the users would not be known to anyone outside of the user. In a VPN, the host of the VPN would be aware of the activities of the users of the VPN, such as the web sites users of the VPN are accessing on their device.

By running the data flow through multiple proxies that are encrypting and routing the data flow, no one entity can see all of the information. Further, no one entity can see the source and destination of the information.

Further, instead of sending all data from an application to anonymizing proxy, only specific web content is sent to the anonymizing proxy. This reduces bandwidth resources resulting in higher bandwidth. This also results in faster processing as the proxy is not applied to all data and is only applied for selected data.

Computing device 140 can include a network subsystem 160 which includes a kernel 150 and a network daemon 155. Computing devices can include mobile devices such as smart phones and tablets. Computing devices can also include, wearable devices, laptops and desktop computers mobile phones.

The network subsystem 160 is a subsystem of the operating system (OS) running on the computing device 140. The network subsystem 160 can include parts of the kernel which are responsible for networking. The network subsystem 160 can also include the network daemon 155. The network subsystem 160 can correspond to a network stack. The network subsystem can also be referred to as the networking sector.

Network subsystem 160 can manage network traffic data. The network subsystem 160 can be used to identify tags from content metadata (or based on the content metadata) that is obtained from an application in association with network data. For example, an application can send the content metadata to the kernel in a request to transmit network data. Content metadata can also be referred to as intent metadata, context metadata, or data about the applications. Content metadata can be used to identify routing security policies that should be applied to the metadata.

The kernel 150 can include programs that control the operating system of the computing device 140. The kernel 150 can control all of the interactions between hardware and software components of the computing device. The kernel can control how data is forwarded to components within the computing device 140. The kernel also can enforce security policies based on tags identified for web content. The kernel 150 can notify the network daemon 155 what it needs to apply.

The network daemon 155 can also be known as a network routine or a network process. The network daemon 155 can perform functions in the background of the computing device. The network daemon 155 can perform functions while under the control of the kernel 150.

In example embodiments, the network daemon 155 can be configured to identify and obtain tag information regarding web content. The network daemon is not limited to seeing, for example, only a hostname or an address for the destination device. The network daemon is able to identify or obtain additional information that can be used to route network traffic data. Therefore, the network daemon can perform a more precise routing of network traffic data.

When the network daemon determines that the application for the main page has built in security features (e.g., Safari), the network daemon can determine that the data flow from that application can proceed without any additional security measures. Applications with trusted built-in security measures can be identified to the computing device. The list of trusted applications can be regularly updated.

Instead of each flow being a separate Transmission Control Protocol (TCP) connection, a network daemon can perform an analysis to determine how the data flow should be routed. Separate TCP connections are not automatically created for each data flow (e.g., data from main page, data from left side bar, data from right side bar, etc.). Further, security processing can be performed in the network layer by the network daemon.

The network daemon can evaluate other elements on the webpage other than the main page. For example, the network daemon can evaluate a sidebar. A side bar can include a user interface element that display information other than the main content. For example, side bars can include advertising information or suggested stories to view next.

The network daemon can determine that the side bar contains third-party web content. This data flow can then initiate DNS resolution for its name. For example, for the name example.com, the DNS daemon can compare the name to a list of names known to be trackers. However, if the name is known to be a tracker, then a marker or tag can be added to the application information indicating that this web content domain is tracking user information.

The list of known trackers can be obtained from companies that maintain a list of known trackers. Specifically, the list of known trackers can correspond to domain names that are known to track user information.

However, tags or categories of tags can also be determined for the content metadata. Tags or tag information can make it easier for the network routine to identify routing security policies that should be applied to the metadata. A tag can include a word, terms, or other identifying marks that describe the web content. Tags can be in a predetermined format that can be easily identified by the network routine. Tags can be identified from the web content or from content metadata associated with the web content.

Tag information can include information regarding the port that the content is connecting to and can also include information regarding the port that is associated with the URL scheme of the content. The tag information can be sent to the kernel and the kernel can determine how to route the network traffic. Therefore, not all HTTP traffic will be routed in the same way.

Since tag information is provided to the kernel routine or determined by the kernel routine, more precise traffic routing can be performed. The additional tagging that is performed enhances the security of the user's data. The network data can be routed along different network routes based on the tagging. The tagging that is identified is associated with security policies for the data. Instead of merely associating a scheme with a default port, additional data is identified and that additional data is used to route the traffic or apply security policies.

B. Computing Device

Figure 2A:
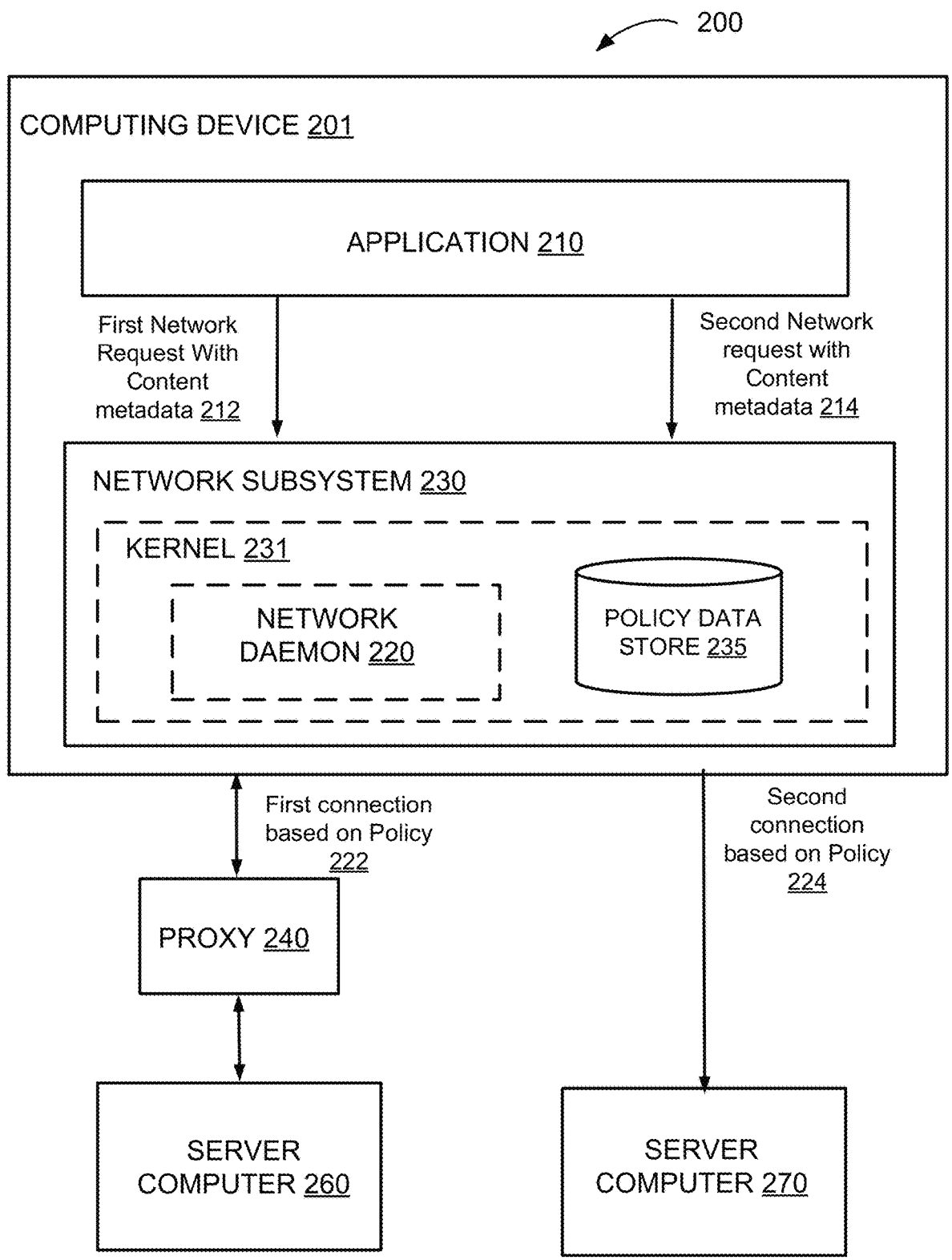
FIG. 2A illustrates a block diagram of an environment including a computing device for routing network data, in accordance with some example embodiments.
Figure 2B:
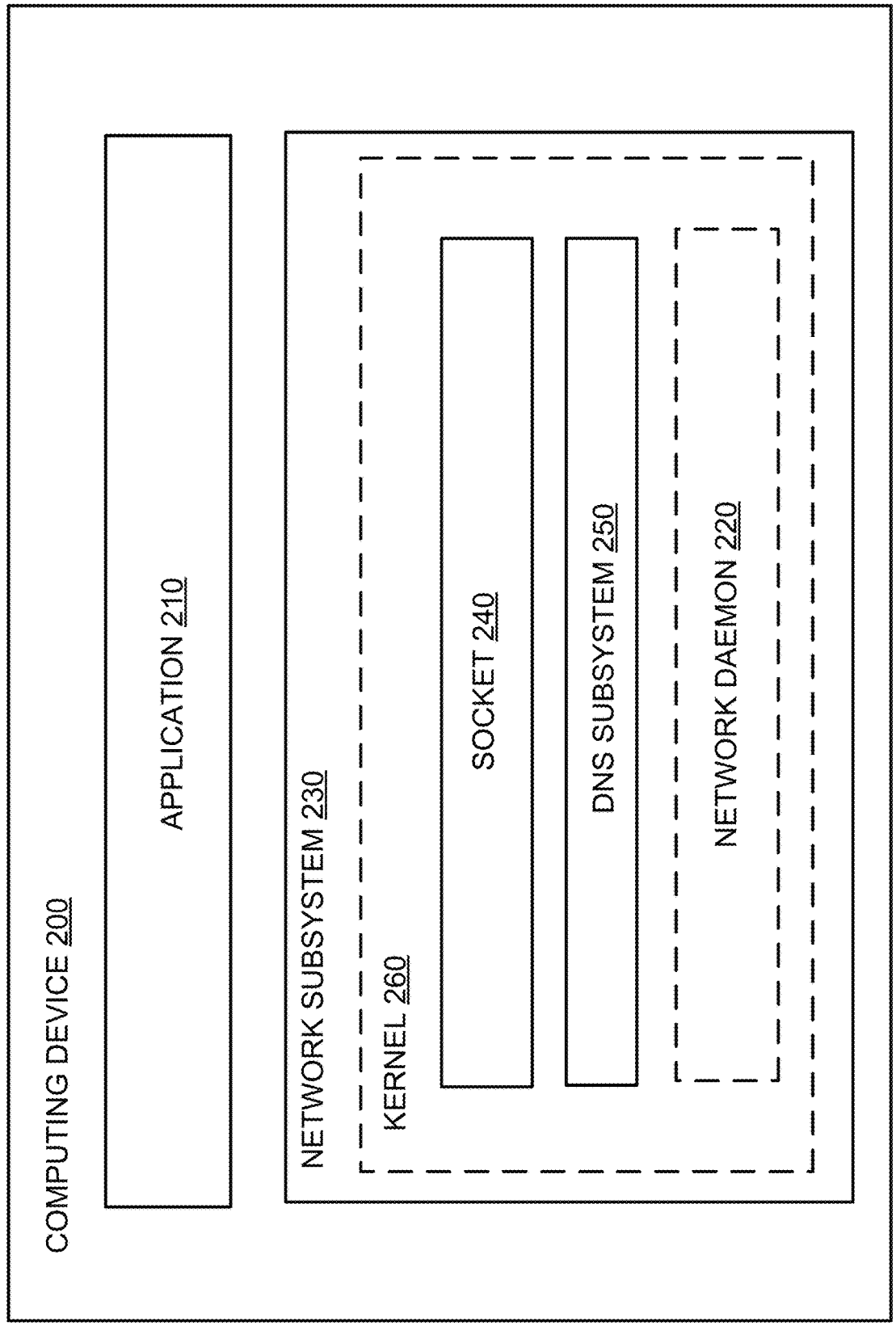
FIG. 2B illustrates a block diagram of a computing device for routing network data, in accordance with some example embodiments.

The computing device 140 of FIG. 1 is described in greater detail with respect to FIGS. 2A and 2B.

FIG. 2A illustrates a block diagram of an environment 200 including a computing device 201 for routing network data, in accordance with some example embodiments. Computing device 201 can include application 210 and network subsystem 230. Network subsystem 230 can include kernel 231, which includes network daemon 220 and policy data store 235. The policy data store 235 can store security policies, which can be applied to content metadata. The policy data store 235 can reside in the kernel 231. The policy data store 235 can be programed by the network daemon 220.

When a user accesses an application, a plurality of different network data flows can occur. For example, when a user accesses a news website, a main page (e.g., the original URL entered by the user) can include the news information, however, there are also sidebars that can include, for example, advertising information. The content within the main page is a separate data flow from the advertising content within the sidebars.

Each of these different types of web content (e.g., main page, sidebar, tracking pixel, etc.) can be routed to their associated web content server or server. Each of these different types of web content can be associated with a flow. A flow can also be referred to as a data flow or a network data flow. A plurality of different data flows can occur when a web page is loaded. When the user interacts with the web content, application information is communicated with the associated server.

As shown in FIG. 2A, a first network request with content metadata 212 and a second network request with content metadata 214 can be received from the application 210. Network request with content metadata 212 can correspond to a first data flow and a network request with content metadata 214 can correspond to a second data flow.

A data flow can be associated with a particular security policy. For example, a data flow associated with main content can be associated with a first security policy. Data flows associated with secondary content (e.g., advertising content) can be associated with second security policy. A security policy can also be referred to as a security protocol.

In the example shown in FIG. 2A, the network daemon 220 identifies a policy to be applied to the first network request and the second network request. The first network request can correspond to main content from a website, and the second network request can correspond to secondary content from a website (e.g., content on a website other than the main content). The main content and the secondary content can also be referred to as or include web functions or web programs, e.g., as opposed to just text or images.

The network daemon 220 can identify a policy to be applied to the first network request based on the content metadata associated with the first network request. When the network daemon 220 determines that the data flow is associated with a tracker name, the network daemon 220 can determine an alternative route for the data flow. That is, the data will not yet proceed to its final destination (e.g., destination server such as server computer 260, as shown in FIG. 2A). Instead of being routed to the final destination, the data flow can instead be routed to a proxy, such as an anonymizing proxy.

The data flows can be associated with different sockets or connections. For example, a data flow associated with advertising information (e.g., secondary content) that is tracking user information can be associated with a socket that is different than a data flow associated with advertising information (e.g., secondary content) that is not tracking user information.

Further, a data flow associated with first advertising information (e.g., first sidebar) that is tracking a user and a data flow associated with second advertising information (e.g., second sidebar) that is tracking user information can be associated with a same socket. Therefore, different data flows that have a same security policy can be associated with a same socket or connection to a server.

As shown in FIG. 2A, network daemon 220 can determine that the first network request should be routed through a proxy 240 before being sent to the server computer 260. The network daemon 220 can establish a first connection based on a policy 222. The first connection can route the network request with content metadata 212 to proxy 240 before being sent to the server computer 260. Such routing can be in response to receiving content metadata from application 210 indicating that the network traffic is to be used for tracking. Such content metadata can include a location of such secondary content on the screen, as well as the DNS information for server computer 260. For example, the content metadata can specify a location for displaying the web content on a screen or display of the computing device.

The network daemon 220 can also identify a policy to be applied to the second network request based on the content metadata associated with the second network request. Some application may have built in security measures for identifying content metadata and tagging web content. If the main page is on a built-in web browser (e.g., Safari), since the web browser is built into the system, the kernel routine can determine that the main page is following security protocols and is not web content that can track user information. Applications with built in security measures can include custom tags. The tag or metadata can include a string of data. The information in the tag can identify whether the traffic data is sensitive are not.

Network daemon 220 can determine that the second network request does not need to be routed through a proxy. The network daemon 220 can establish a second connection based on a policy 224. The second connection can route the second network request with content metadata 214 directly to server computer 270 without requiring the network request to be routed through a proxy.

FIG. 2B illustrates a block diagram of a computing device 200 for routing network data, in accordance with some example embodiments. The computing device 200 can include an application 210. The application 210 can manage information regarding a plurality of different applications accessible by the computing device 200. The application 210 can correspond to components of an application layer of an Open Systems Interconnection (OSI) model.

The computing device 200 can include a network subsystem 230, which includes kernel 260, socket 240, and DNS subsystem 250.

Domain Name System (DNS) subsystem 250 can be used to obtain domain name resolution information for an website. The DNS subsystem 250 can also be referred to as a DNS resolution daemon. DNS subsystem 250 can obtain the IP address associated with web addresses that are tracking user information. The DNS resolution subsystem 250 can maintain a table of IP addresses that were learned from DNS resolutions to be IP addresses of websites that track user information. The DNS subsystem 250 can provide this information to the kernel 260. The kernel 260 can then use this information to determine whether an IP address is tracking user information.

The socket 240 can include one or more sockets or connections that are created in order to transmit network data from the computing device to the server device. The socket 240 can also be known as a connection. A socket can be created for each web content data flow. Different data flows can go to different sockets. For example, more sensitive data can go to one socket, and less sensitive data can go to another socket.

Figure 3:
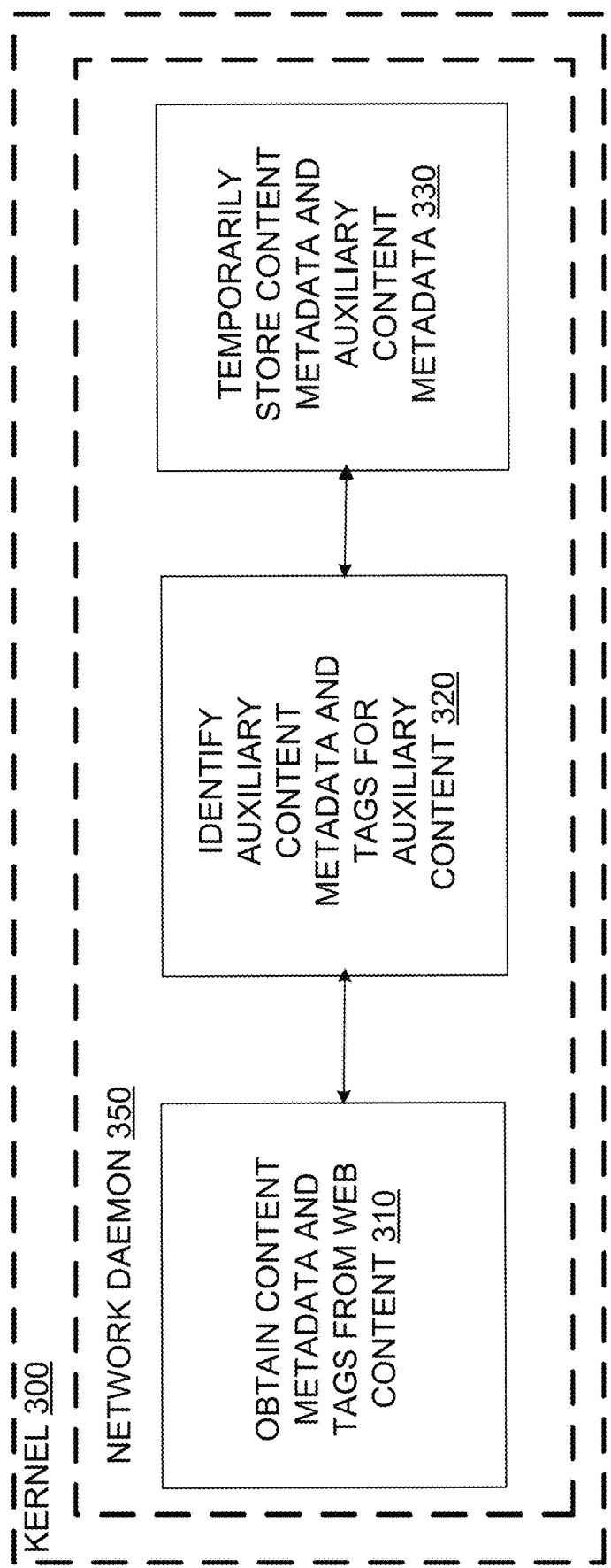
FIG. 3 illustrates a block diagram of a kernel for routing network data, in accordance with some example embodiments.

The kernel is described in greater detail with respect to FIG. 3. The network subsystem is described in greater detail with respect to FIG. 4.

1. Kernel

The kernel can decides the connections that can be made by the computing device. The kernel can be the arbiter of all connections. When a socket is created, the kernel can allocate a port to each data flow. The kernel provides the data flows with ports from which network data can be sent.

FIG. 3 illustrates a block diagram of a kernel 300 for routing network data, in accordance with some example embodiments. The kernel 300 can control a network daemon 350. The network daemon 350 can perform one or more processes for managing network data.

In an example embodiment, the kernel is configured to identify or generate content metadata for web content. The kernel can identify tags that are associated with the content metadata. The kernel can then identify the security policies that are associated with the tags. The security policies can identify how the network data is to be routed to a destination device. Therefore, the kernel can obtain and identify security policies for content metadata.

A network daemon 350 is provided to securely route network traffic data. The network daemon 350 can evaluate all of the web content (e.g., main content, ads, images, articles, etc.) that appear when a web page is loaded and can determine how they should be processed.

The network daemon 350 can be configured to identify content metadata from web content. The content metadata can be based on information that the user has typed in, or can be based on the URL. Therefore, based on the content metadata (e.g., URL data), the kernel can determine the intent or context of the data flow.

Intent can refer to a purpose of the web content. Intent can be obtained based on the URL of the web content. For example, the URL can indicate an intent or type of content. The intent can indicate that information is being provided to a user and that the web content does not need to collect information regarding the user. The intent can indicate that news information or sports information is being provide. The intent can also indicate that shopping content is being provided.

Context can refer to circumstances or conditions associated with the web content. The context can identify an environment or background information associated with the network data. For example, based on the URL, context can be obtained regarding the types of information sources that are being used by the user (e.g., scholarly articles, news articles, etc.).

The content metadata can be used to identify tag information. Tag information provided by the application may not be sufficient for the kernel to determine how the data should be routed. For example, the tag information provided by the application may not provide sufficient information regarding the intent and context of the data that is being sent to the network. Further, some applications may not be following tagging protocols and my not be providing accurate tag information.

Therefore, the kernel can identify additional or auxiliary tag information so that the kernel can sufficiently decide how to process the web content. The kernel does not need to rely on the tag data provided by applications, and can instead on its own, identify additional tag information to ensure the security of a user's data. The kernel can locally store the additional tag information. The kernel can use this additional tag information to more accurately determine how network data should be routed.

The network daemon 350 can determine that the secondary content is third party content, and therefore, further analysis of the data flow needs to be performed. The kernel can determine whether the domain associated with the data flow content is tracking the user. A DNS daemon can compare the domain for the secondary content with a list of domains that are trackers. If the domain is identified as a tracking domain, then the kernel can determine that security policies will need to be applied.

The network daemon 350 can also be referred to as a routine in the kernel or network daemon 350. The network daemon 350 can be performed by a network daemon or computer program under the control of the kernel. Throughout the description, the routine may also be referred to as the kernel as the routine is operating through the kernel.

At step 310, as shown in FIG. 3, the network daemon 350, under the control of the kernel, can obtain content metadata and tags for the content metadata for web content. The web content can include tag information that was provided with the web content. For example, some web content providers provide tag information in the web content. Therefore, the network daemon can obtain this content metadata that is made available from developers of the web content.

However, in some instances, the web content does not contain any tag information or insufficient tag information for identifying a security policy. A security policy can identify a security protocol to apply to the web content. A security policy can identify when policies are to be enforced.

At step 320, the kernel 300 can identify auxiliary or additional content metadata for the web content and tags for the auxiliary or additional content metadata. This auxiliary information can also be content metadata associated with web content. The auxiliary or additional content metadata can also be referred to as auxiliary content metadata. The auxiliary content metadata can be identified by the kernel itself. Routing can be performed based on the auxiliary content metadata. Security policies can be determined by the network routine for the auxiliary content metadata. However, tags can be created for the auxiliary content metadata. Identifying tags for the auxiliary content metadata can make policy identification more efficient.

Instead of the kernel using tag information that is provided by web content, additional tag information can be identified for the web content. The kernel can obtain the additional information based on the DNS resolution that is performed. This additional information can be stored in a data store in the network subsystem. The data can be stored in the form of a table. The kernel uses the content metadata and auxiliary content metadata to determine what security and privacy policies should be applied.

Based on the tag information, the kernel can determine whether or not security measures are needed when routing network traffic data. For example, the kernel can determine that the network data should be routed to an anonymizer proxy. By routing the data through the anonymizer proxy, the user is provided with IP address protection. Alternatively, or in addition to the anonymizer proxy, the kernel may determine that data should be encrypted.

At step 330, the kernel 330 temporarily stores the content metadata obtained for the web content and the auxiliary content metadata that was identified by the kernel. The content metadata and/or auxiliary content metadata is temporality stored until the network data flow has been routed. After the network data flow has been routed, the data can be removed from the computing device. For example, when a socket closes, the content metadata, auxiliary content metadata and associated tag information can be cleaned up and removed from the system so that information is not maintained. Information specific to the flows can be removed.

2. Network Subsystem

A kernel and network daemon can be part of a network subsystem. However, the network subsystem can include additional elements.

Figure 4:
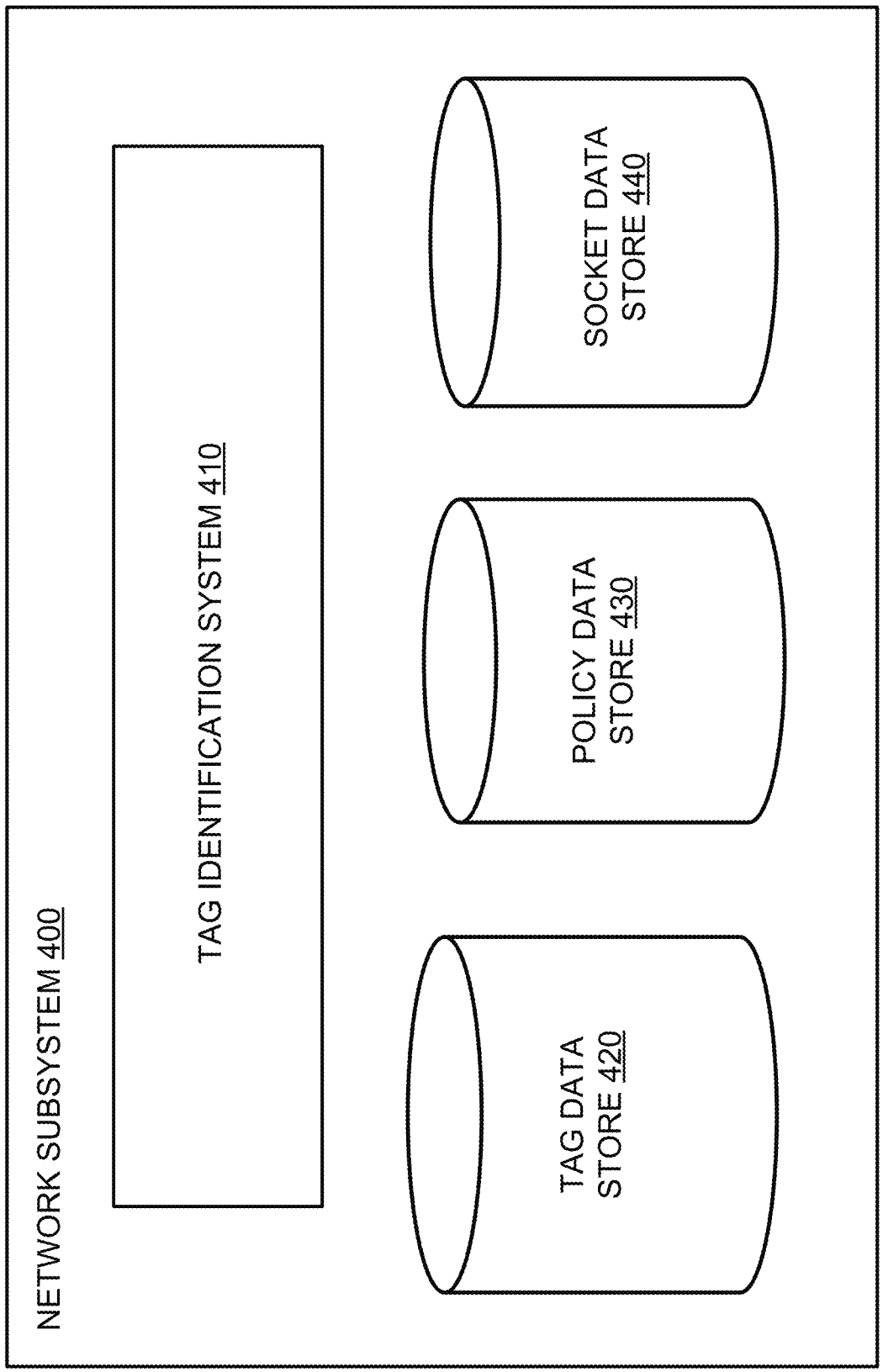
FIG. 4 illustrates a block diagram of a network subsystem for routing network data, in accordance with some example embodiments.

FIG. 4 illustrates a block diagram of a network subsystem 400 for routing network data, in accordance with some example embodiments.

Network subsystem 400 can include a tag identification system 410, tag data store 420, policy data store 430, and socket data store 440. Network subsystem 400 can operate under the control of a kernel.

The tag identification system 410 can identify tags that are associated with content metadata and auxiliary content metadata. The tags can be obtained from the content metadata provided by the web content or the kernel can identify tags based on the auxiliary content metadata that was identified from the web content.

Tag data store 420 can store a plurality of different tags that can be applied by the kernel. Tag data store 420 can also store auxiliary tag information that was identified by the kernel. In addition to tagging information (e.g., content metadata) that is provided by the web content themselves (e.g., domain name information), additional tagging information is identified and stored by the kernel. Intent and context is used so that the network data can be tagged with additional information.

Policy data store 430 can store a plurality of different security policies that are to be applied to tags. The policy data store 430 can store information regarding data flows. The policy data store can store information regarding web content and their associated tagging information. The additional tagging information can include an extensible list of type link value fields of metadata.

Socket data store 440 can store socket or connection information. Every data flow can be associated with a socket. For example, a data flow associated with main web content (e.g., main content) can be associated with a socket and a data flow associated with secondary content (e.g., side bars) can be associated with another socket. Socket data store 440 can store state information for all of the open sockets. The state information can include whether or not the socket is open or closed, but can also include the content metadata and tag information that was used in establishing the socket. When a connection to a socket closes, the socket data store 440 can automatically be updated to remove the closed connection.

Figure 5:
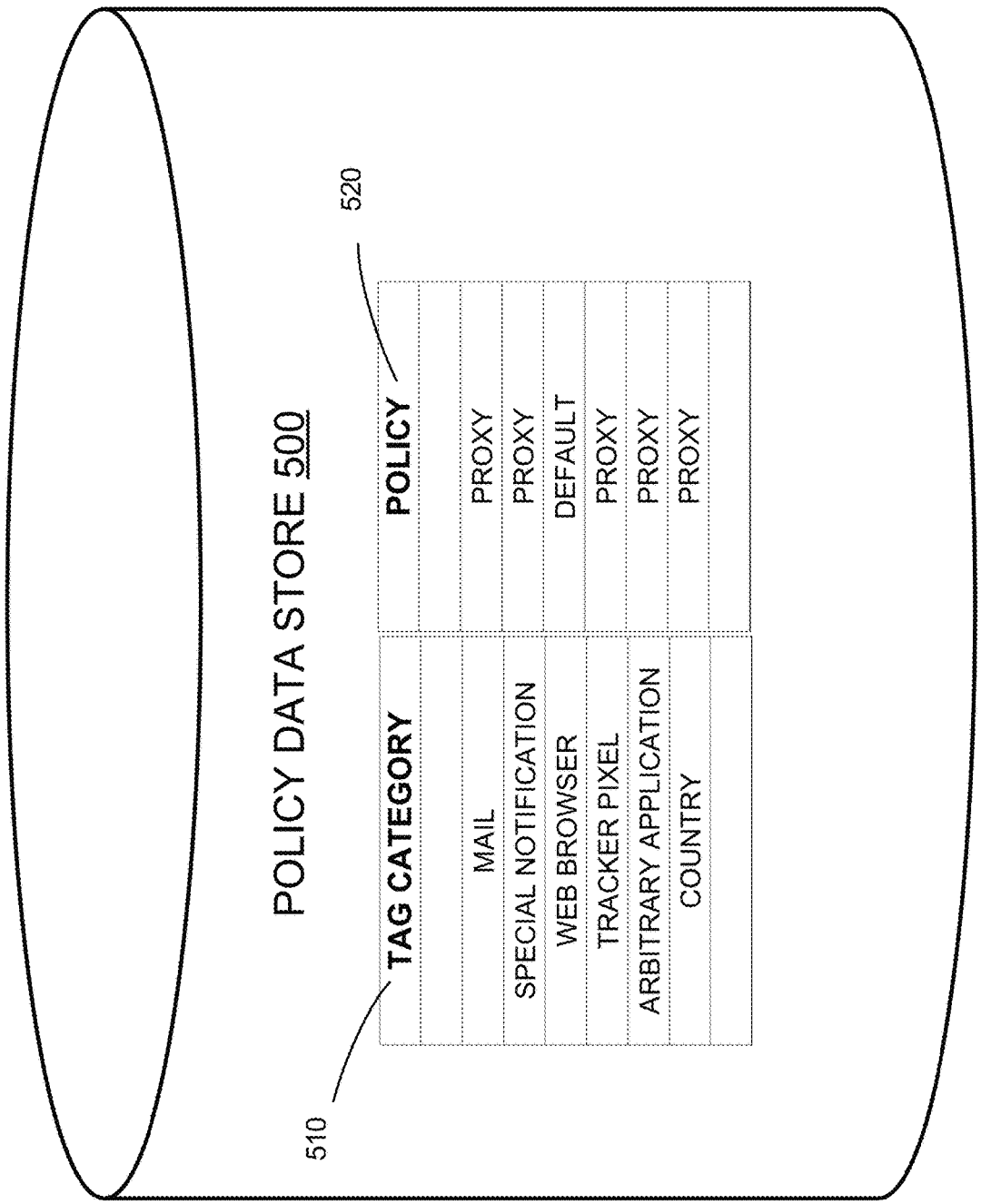
FIG. 5 illustrates a policy data store of the computing device, in accordance with some example embodiments.

The kernel can be configured to identify and manage policies to be applied to network data based on the tags associated with the network data. FIG. 5 illustrates a policy data store 500 of the computing device, in accordance with some example embodiments. Policy data store 500 can correspond to policy data store 430 of FIG. 4.

Policy data store 500 of a network subsystem can store tag information and policy information. Specifically, the policy data store 500 can store tag information 510 and policies 520 to be applied to particular tag information. The policies can also be known as rules, routing policies, or routing rules. The tags shown in FIG. 5 identify privacy and security policies to apply to the data flow.

In the example shown in FIG. 5, tags can include mail, special notifications, web browser, tracking pixel, arbitrary application, and country. Special notifications can include exposure notifications. For example, applications are directed to user is providing information regarding possible illnesses the user may have been exposed to. A tracking pixel is a graphic that can be loaded and appear when visits a webpage or opens an email. The tracking pixel may not be visible to the user, however, it is collecting information regarding the user. An arbitrary application can be an application that does not fall under a predefined category. A country can refer to an application originating from a particular country. These are merely examples, and additional tags can be identified or obtained by the kernel.

In the example shown in FIG. 5, web content that has a tag of mail, special notification, tracker pixel or arbitrary application can be routed through a proxy. Web content that has a tag of web browser will not be routed through a proxy. These are merely examples and the routing policies for a different types of tags may be stored.

3. User Interface

In an example embodiment, the user can indicate that they would like certain types of user information (e.g., user interactions with advertisements) to remain confidential. Specifically, the user can indicate that they would like their browsing that results in the tracking of their information to be proxied.

A user can decide to have certain data proxied when a user does not what certain data to be tracked. A proxy or proxy server can include a server device that protects a user's data before it is sent to the browsing destination. The proxy server provides a level of security and privacy to the user's data For example, a user may decide that they do not want their activities with respect to secondary content (e.g., suggested articles, advertising information, etc.) to be tracked. Therefore content that the user accesses on the main content will not be proxied, but information that the user accesses that is not from the main content will be proxied so that an additional layer of protection is provided to such data.

An example embodiment allows a user to customize the types of web content and the that receive additional security measures.

Figure 6:
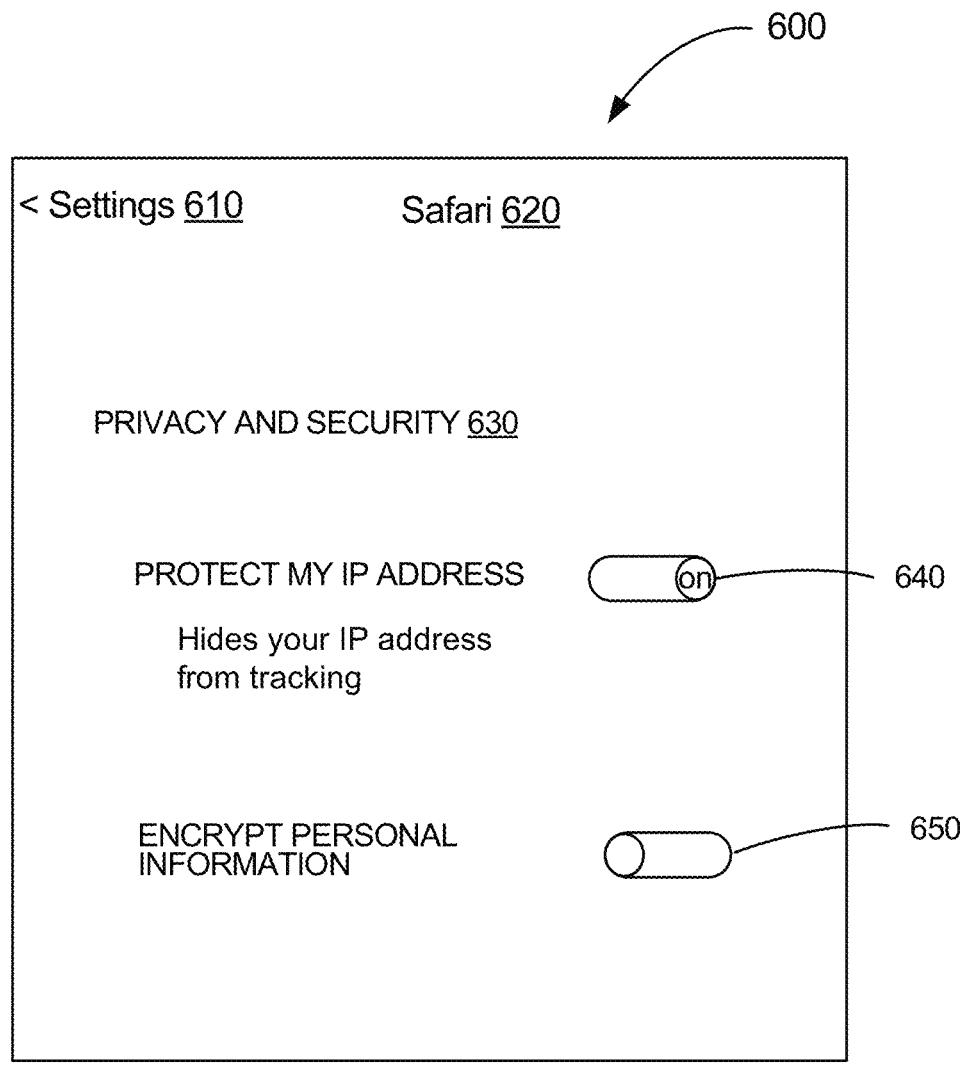
FIG. 6 illustrates a user interface for configuring routing settings, in accordance with some example embodiments.

FIG. 6 illustrates a user interface 600 for configuring routing settings, in accordance with some example embodiments.

As shown in FIG. 6, a user can configure how their information is to be processed. The user can configure the privacy and security settings for a particular application or for all applications that the user accesses on their device.

In the example shown in FIG. 6, the user interface 600 is for a mobile device, but configuration can be performed for different devices through which applications are accessed. In the example shown in FIG. 6, the user is configuring the settings 610 for a web browser 620 (e.g., Safari). Within the web browser, privacy and security settings 630 can be configured. Privacy and security setting 530 can include various options for configuring privacy and security of user data while using the web browser.

If "protect my IP address" 640 is selected, then the user's IP address can be made anonymous while using the web browser. This would hide the user's IP address from tracking. In another embodiment, the user can select specific instances that the user's IP address is made anonymous while using the web browser.

Although the example shown is for configuring a specific web browser, alternative embodiments can allow a user to apply the same privacy and security settings to all applications on the mobile device.

When the user selects the button to "Protect my IP address" then the kernel of the computing device can process all tracking data to ensure that the user's IP address is not provided. All data from the user's browsing history can pass through the proxy server. The user's IP address will not be known to any device outside device. The user's public IP address will not be visible and the web sites visited by the user will not be known to other devices. Only the IP address of the proxy server can be seen. Therefore, device identification of the user is not known and interne activity, such as the web pages accessed by the user, are not visible.

The user can also select the toggle button for "encrypt my personal information," 650 which would encrypt the user's information for applications in which encryption of user data is possible.

Additional configurations can be provided other than those shown in FIG. 6. The user interface 600 is shown for configuring security and privacy for a web browser application. However, tracking configurations can be implemented for other applications, such as an email application. Further, a universal configuration option can be provided which would also a user to select the hide my IP address option for all applications. Therefore, a user does not have to individually configure their security and privacy settings for each application.

The user interface shown in FIG. 6 is on a mobile device, however, privacy and security configurations can be performed on user interfaces for a plurality of different devices, such as tablet devices, wearable devices, laptops, and desktop computers.

II. Methods for Securely Routing Web Content

A user may be accessing a web content on a web browser. The web content can be associated with an application. The web content can be, for example, a news website. As the user interacts with the website, tags are created by the application associated with the web content. The tags identify information regarding what sections of the website the user has accessed and/or identify information that the user has provided. The tagging is performed so that the application associated with the web content can provide more customized information to the user.

However, the user's interactions with web content or the information provided by the user can include sensitive information. Example embodiments allow a user to customize how their network data is routed. Alternatively, the computing device can determine how network data is routed to ensure privacy and security of user data.

Further, as a user navigates through a webpage, the user may select certain ads for certain products that appear on the webpage. Therefore, as users interact with the web page, additional information regarding the user may be collected.

A. First Network Data Flow—First Policy

A data flow can be routed based on particular security policy. Data flows that do not include sensitive user information can be routed differently from data flows which track sensitive user information.

Figure 7:
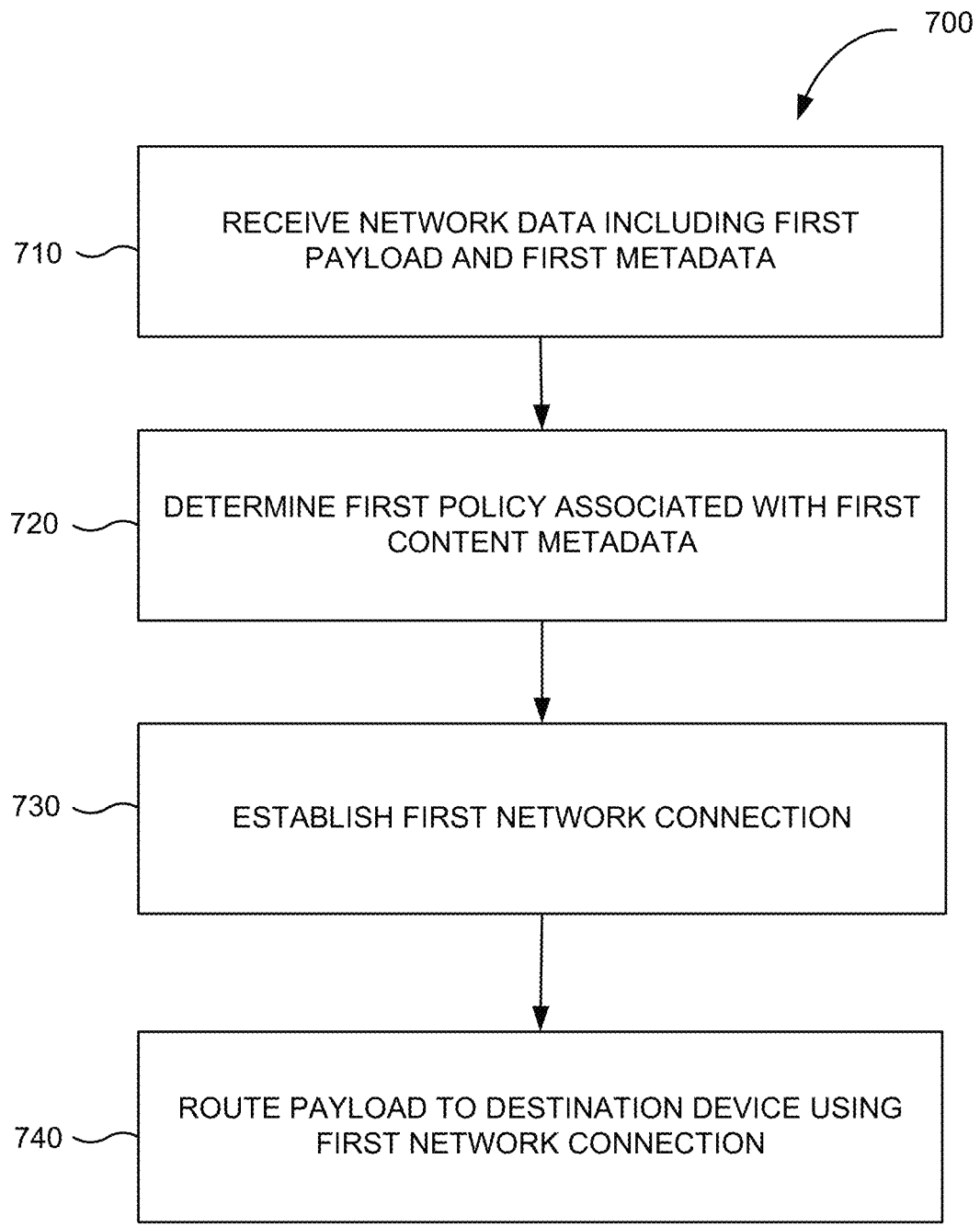
FIG. 7 illustrates a flowchart of a method for routing a first network data flow for a first application, in accordance with some example embodiments.

FIG. 7 illustrates a flowchart of a method for 700 routing a first network data flow for a first application, in accordance with some example embodiments. The first network data flow can correspond to, for example, a data flow for main content.

At step 710, the network routine that is executing in a kernel of the computing device receives network data comprising a first payload and first metadata. The first payload and the first metadata can be received from an application that wants to connect to another device on a network. The metadata can describe the data associated with the application. The network routine can also be known as a network daemon. The network routine can receive the first payload and first metadata from a first application that is executing on the computing device.

A network data packet can include a header and a payload. The header can contain instructions about the data that is in the packet. Header information can include the length of the packet, a protocol for the packet (e.g., email, webpage), the destination address and originating address and a payload. The payload or the body of the packet can include the data that the packet is delivering to the destination. The packet can also include metadata. The metadata can include additional information regarding intent in context of the packet of data associated with the application. The destination device can be a server device associated with the first network data flow.

The first metadata can include first address data specifying a destination device to which the network data is to be sent over a network and first content metadata describing first application data that triggered a first request to send the network data. The first content metadata can identify an intent or a context of the network data.

At step 720, the network routine determines a first policy associated with the first content metadata. The first policy can specify a first security protocol for sending the first payload to the destination device. As examples, the first security protocol can include an encryption protocol or a double proxy protocol.

At step 730, the a first network connection can be established between the first application and the destination device. The first network connection can also be known as a first socket. The first network connection is established in order to transmit the network data that matches the first policy. The first network connection is based on the first security protocol.

At step 740, the network routine in the kernel can route the first payload to the destination device using the first network connection.

The described examples are directed to a website, however, user information can be protected from content other than websites. In addition to web content that tracks user information, certain types of traffic may be particularly sensitive, such as an unencrypted HTTP web transaction. Such traffic could leak user credential information or could leave sensitive user information vulnerable to attack. Attackers may attack a local network and read a user's content or monitor the user's activity on a computing device.

In the past, all traffic for a particular port were routed the same way. For example, all HTTP traffic are routed a particular way. However, there is often nonstandard port usage for HTTP content. For example, a URL such as HTTP://example.com:8080, is associated with a nonstandard port. The URL is using an HTTP scheme. However, based on the URL information, and even though the URL is following in HTTP scheme, the website could result in user information being vulnerable, and therefore additional policies associated with that URL may need to be applied.

Therefore, even though the URL follows a standard format (e.g., HTTP), the kernel can determine that additional processing is needed based on, for example, the intent and context of the data (e.g., "example.com:8080"). The kernel can determine that encryption should be enabled to prevent any attackers from seeing the users personal information.

B. Second Network Data Flow—Second Policy

Data flows that include sensitive user information can be routed differently from data flows which do not include sensitive user information.

Figure 8:
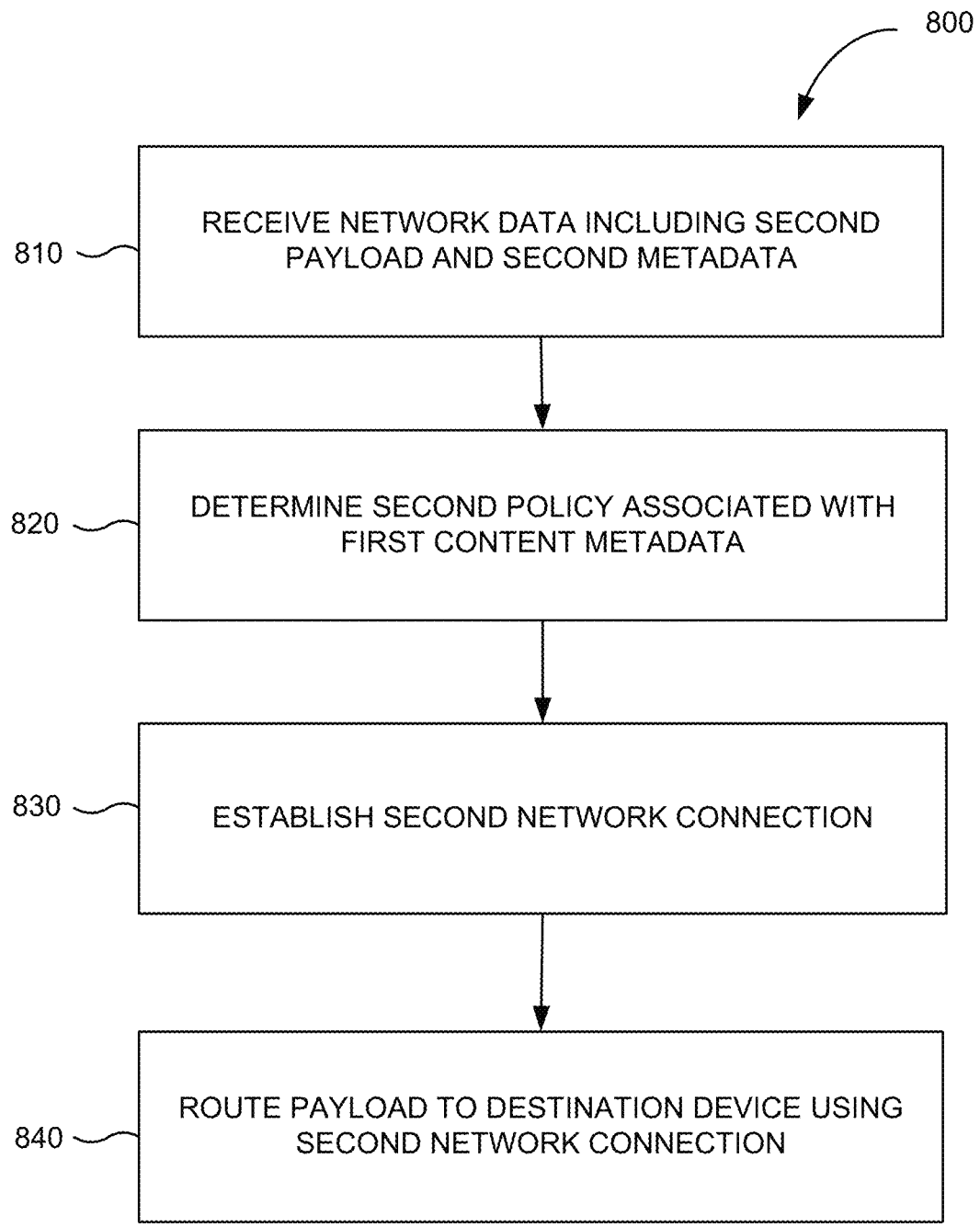
FIG. 8 illustrates a flowchart of a method for routing a second network data flow for a first application, in accordance with some example embodiments.

FIG. 8 illustrates a flowchart of a method 800 for routing a second network data flow, in accordance with some example embodiments. Method 800 can occur with the same application involved for method 700, and can be part of a same session (e.g., resulting from a same web session with a web site, but requiring web content from other servers). In the example shown in FIG. 8, the second network data flow matches a second policy. The second network data flow can correspond to, for example, a data flow for secondary content. In relation to FIG. 2A, method 700 can implement the connection for policy 224, and method 800 can implement the connection for policy 222, e.g., as a result of the specific properties of the secondary content.

At step 810, the network routine can receive network data including a second payload and second metadata from a second network flow executing on the computing device. The second metadata can include second address data specifying a second destination device to which the network data is to be sent over the network and second content metadata describing second application data that triggered a second request to send the network data. The second destination device an can be a server device associated with the second network flow.

At step 820, the network routine can determine a second policy associated with the second content metadata. The second policy can specify a second security protocol for sending the second payload to the destination device. The second security protocol can include an encryption protocol or a double proxy protocol.

At step 830, a second network connection can be established. The second network connection can also be known as a second socket. The second network connection is established to transmit network data between the second application and the second destination device. The second network connection can be configured to use the second security protocol.

At step 840, the network routine can route the second payload to the second destination device using the second network socket. In this manner (e.g., as shown for FIGS. 7 and 8), the network routine can route different network traffic from an application using different polices as determined using content metadata obtained from the application. Such flexibility can allow different parts of a website corresponding to different types of data and functions to have corresponding traffic sent differently, e.g., based on sensitivity concerns.

Accordingly, in the examples shown in FIGS. 7 and 8, a single web address accessed by a user can result in a plurality of different data flows. Each of the data flows can be routed according to security measures needed to ensure security and privacy of the data flow.

C. Sequence Diagram—Application Tag Information

Content metadata obtained from web content can be used to identify a security policy for routing the data. However, content metadata can also include tag information. Tag information can make it easier and more efficient for the network routine to identify a security policy for the web content.

Figure 9:
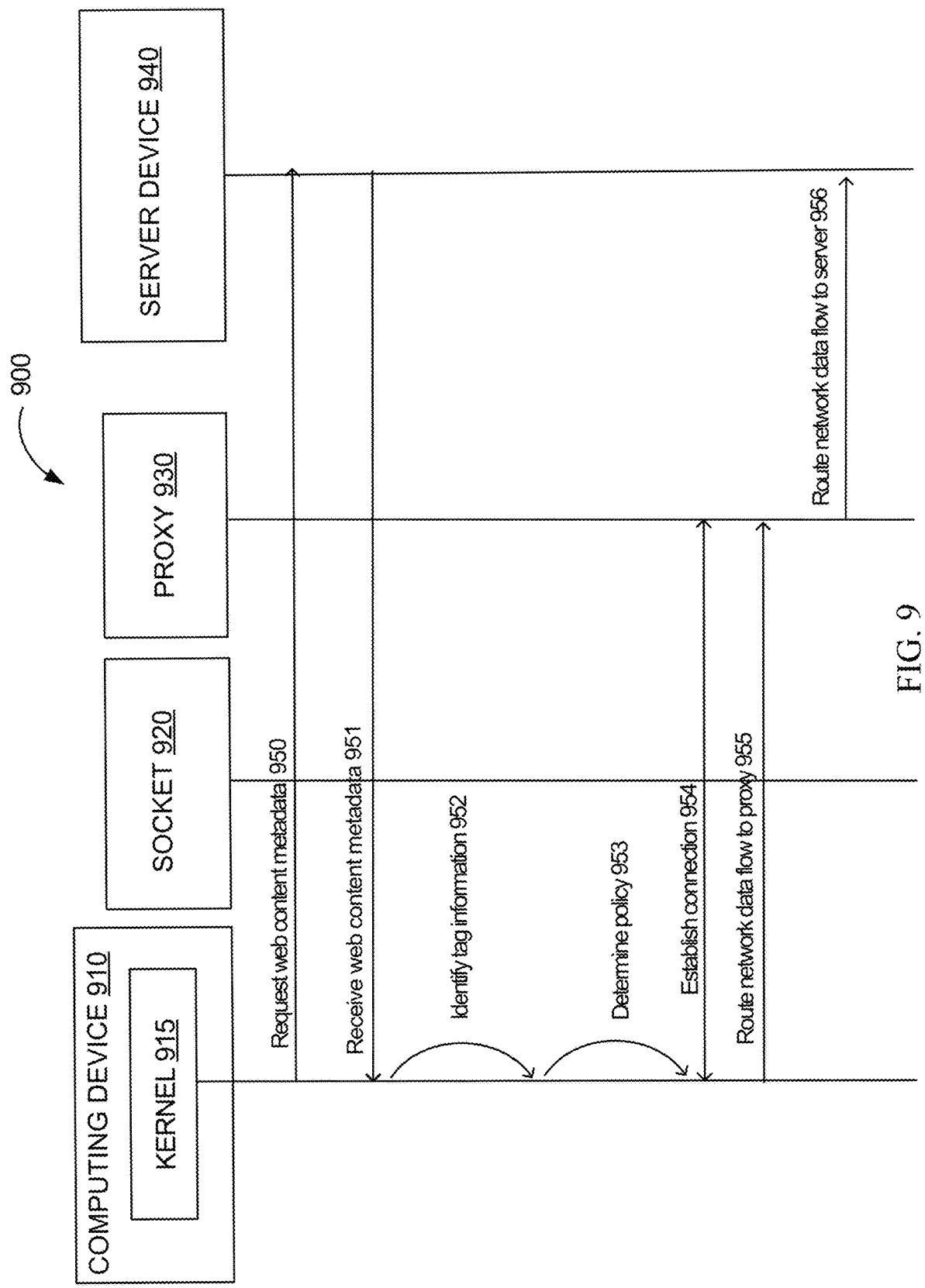
FIG. 9 illustrates a sequence diagram for routing network data based on content metadata from an application, in accordance with an example embodiment.

FIG. 9 illustrates a sequence diagram 900 for routing network data based on content metadata obtained from an application, in accordance with an example embodiment.

FIG. 9 illustrates the communication between the kernel 915 of a computing device 910, a socket 920, a proxy 930, and a server device 940 The server device 940 hosts the information associated with the web content.

At step 950, the kernel 915 of the computing device 910 can request information regarding web content from the server device 940. Web content can correspond to main content on a web page or secondary content on a web page.

At step 951, the server device can provide the requested web content to the computing device 910.

At step 952, the kernel can obtain tag information from the content metadata.

At step 953, the kernel can determine a policy for the network data flow. For example, the kernel can determine whether the network data flow should be routed to a proxy 930 or whether the network data flow can proceed with the server device 940. Since use of the proxies is selective, that is not all data is sent through the proxy, this increases bandwidth, decreases traffic, and reduces latency.

At step 954, the kernel can create a connection to a proxy or server device via the socket 920. In the example shown in FIG. 9, it is determined that the network data flow should be routed to a proxy. Therefore, a connection to a proxy is established.

At step 955, the network data flow is routed to the proxy 930. The proxy 930 can include an anonymizer proxy and/or an encryption proxy.

At step 956, the network data flow is routed from the proxy to the server device.

In the example shown in FIG. 9, the tag information available from the application for the web content is sufficient for the kernel to determine an appropriate security protocol. However, in some instances, an application may not provide any tag information, or the tag information may not be sufficient to identify a security protocol. Therefore, the kernel can identify auxiliary content metadata and auxiliary tag information for web content.

D. Auxiliary Content Metadata

Web content may not contain sufficient content metadata or tag information for the network routine to identify a security protocol. Therefore, in accordance with some example embodiments, the network routine can obtain additional or auxiliary content metadata from the web content.

Further, in some example embodiments, the network routine can identify auxiliary tag information. Auxiliary tag information can include information that is not provided in a predetermined format in the web content metadata. Some web content providers may not be following appropriate tagging protocols and therefore, the web content does not have sufficient tag information for the kernel to determine how to route the network data. Therefore, in accordance with some example embodiments, the kernel can obtain and assign additional tag information for the content metadata.

Figure 10:
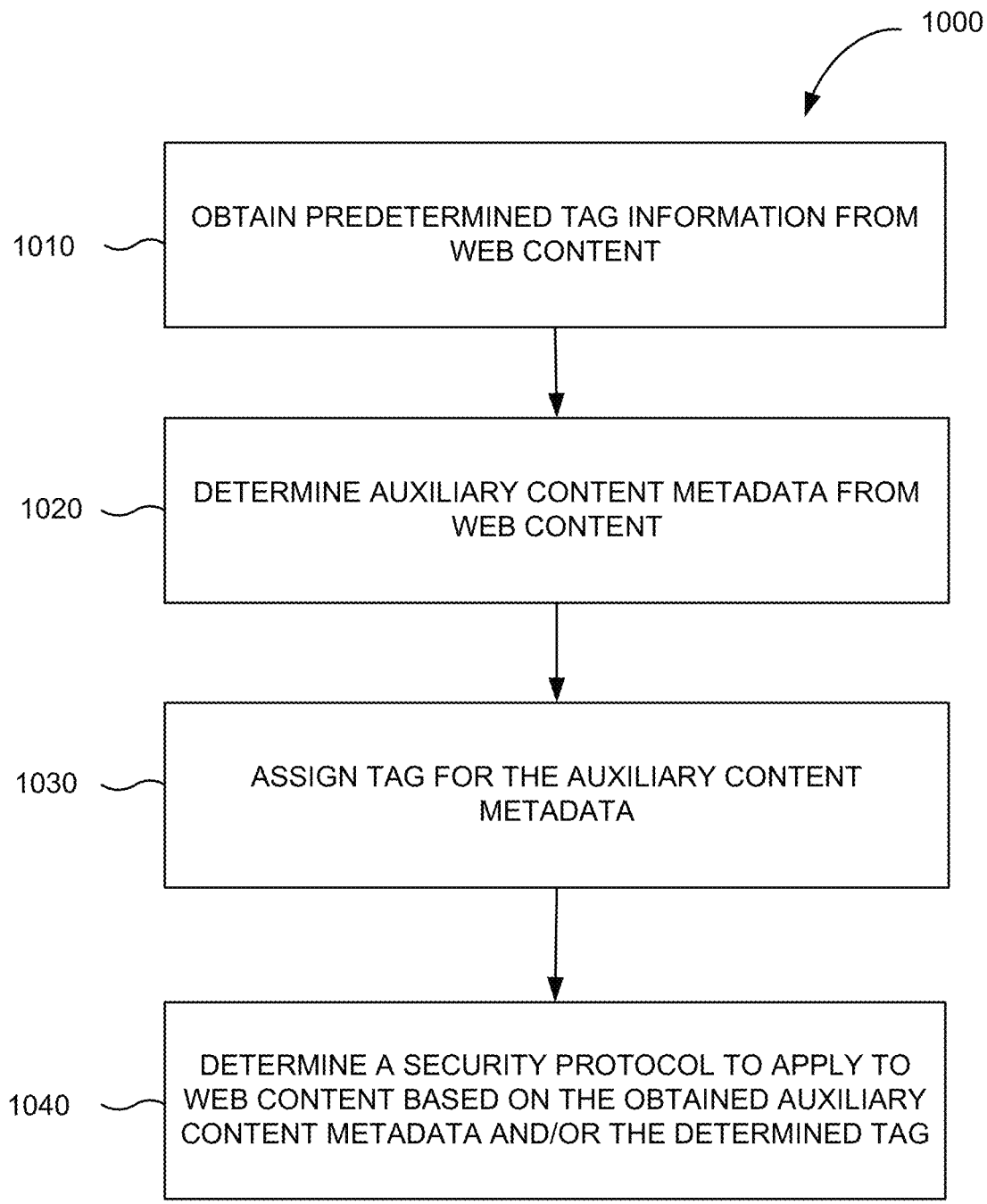
FIG. 10 illustrates a flowchart of a method for routing network data using auxiliary content metadata, in accordance with some example embodiments.

FIG. 10 illustrates a flowchart of a method 1000 for routing network data using auxiliary content metadata, in accordance with some example embodiments.

At step 1010, the kernel can obtain tag information from the web content that is associated with the data flow. In some instances, web content have provided tag information for web content. However, in some instances, applications may not provide tag information for their web content. In some instances, the tag information that is provided may not be sufficient to determine whether a security policy needs to be applied to the data flow.

When the tag information is not sufficient to determine secure routing of the network data, at step 1020, the kernel can determine auxiliary content metadata from the application. The kernel can determine auxiliary content metadata based on intent and context that can be derived from the web content. For example, intent and/or context can be determined based on the web address for the web content or from metadata associated with the web content.

Additional information about the application that can be inferred by the system could also include which names were used to derive the Internet address of the content and how the application was launched. If the name of the content being accessed is not tagged directly on the data by the application, the kernel can learn via the DNS subsystem which names were used to derive the Internet address of the content, and thus be able to tag the data. The kernel can also tag based on how the application was launched. For example, a web browser view may be launched from within another application. When a web browser view is launched from within another application, this can provide information about an intent and purpose which is different from an intent and purpose that can be derived if the website was launched in a default browser where a URL is entered and directly launched.

At step 1030, tags can be assigned to the auxiliary content metadata. The tags can be assigned based on the information identified in the auxiliary content metadata. For example, tags can be assigned based on determinations on whether the content metadata is associated with a web browser application or email application.

At step 1040, a security protocol can be identified based on the tags. The network data can be routed based on the identified security protocol. For example, different types of tags can be associated with different security policies or protocols as shown in FIG. 5.

As disclosed in example embodiments, the kernel can use information provided by an application to route network traffic data, as well auxiliary information determined by the kernel.

E. Sequence Diagram—Auxiliary Tag Information

The network routine can identify auxiliary tag information for routing network data. Auxiliary tag information can include information that is not provided in a predetermined format in the web content metadata.

Figure 11:
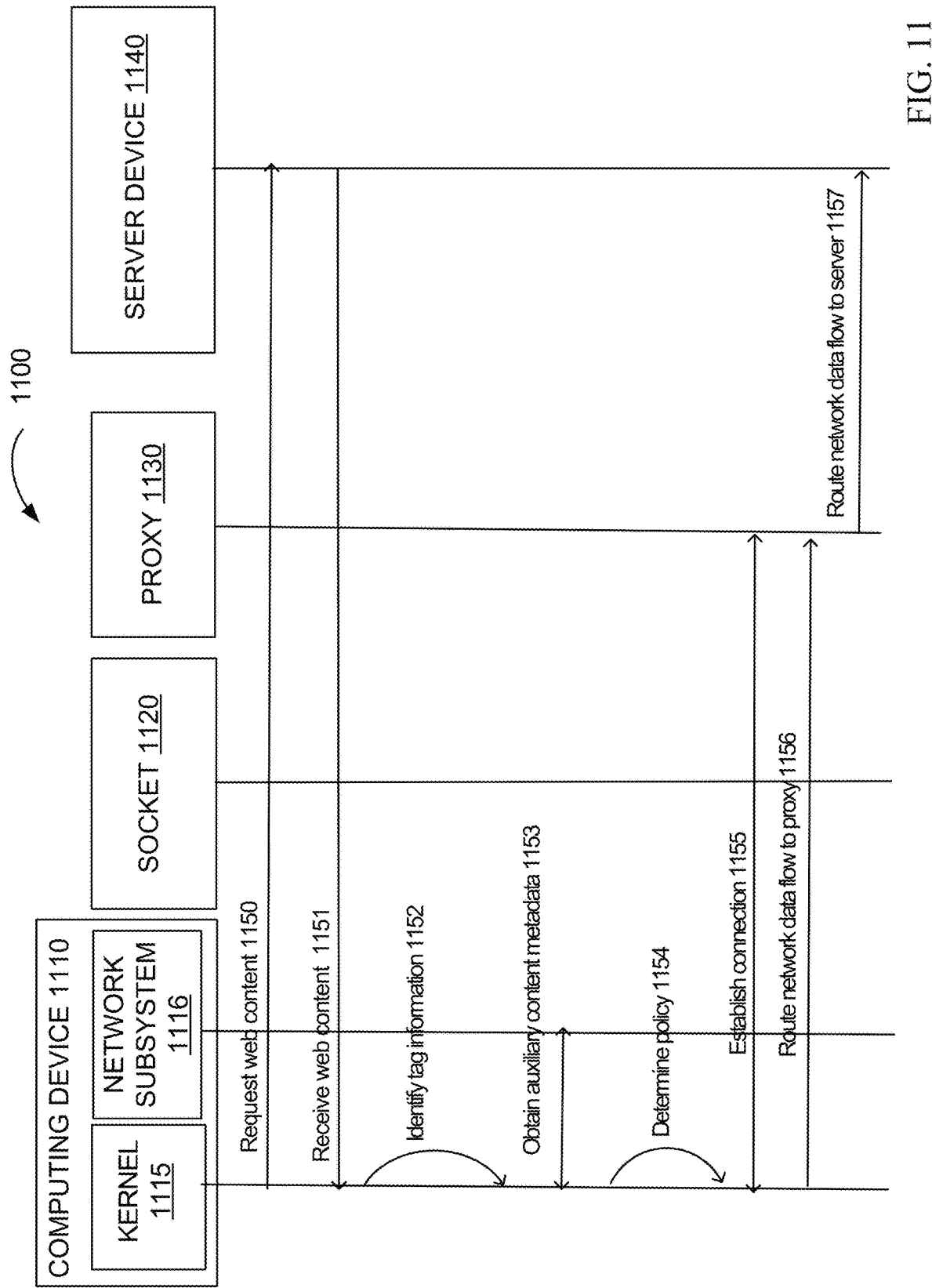
FIG. 11 illustrates a sequence diagram for routing network data based on auxiliary content metadata, in accordance with an example embodiment.

FIG. 11 illustrates a sequence diagram 1100 for routing network data based on auxiliary content metadata, in accordance with an example embodiment.

FIG. 11 is similar to that shown in FIG. 9. However, in the example shown in FIG. 11, the kernel obtains auxiliary tag information. That is, the kernel generates additional tag information that was not provided by the web content. Therefore, the kernel can identify additional intent and context from the content metadata. The intent and context can be used to determine tags and the associated security policies.

FIG. 11 illustrates the communication between the kernel 1115 of a computing device 1110, a socket 1120, a proxy 1130, and a server device 1140. The server device 1140 hosts the information associated with the web content.

At step 1150, the kernel 1115 of the computing device 1110 can request information regarding web content from the server device 1140. Web content can correspond to main content on a web page or secondary content on a web page.

At step 1151, the server device can provide the requested web content to the computing device 1110. Thus, the kernel can received the requested web content, and the kernel can then forward the web content to an application, which can analyze the web content and provide web content metadata.

At step 1152, the kernel can obtain tag information from the content metadata provided by the application. The kernel can determine that the tag information provided by the content metadata is not sufficient to determine whether a security protocol needs to be applied to the data. Some web content may not have tag information or may not be properly tagged. Therefore, the kernel cannot rely on the tagging for such web content. Instead, the kernel routine itself can identify tags for some web content.

Therefore, at step 1153, the kernel can obtain additional tag information from the network subsystem 1116. The network subsystem 1116 can correspond to the network subsystem 400 as shown in FIG. 4.

At step 1154, the kernel can determine a policy for the network data flow. The kernel can determine the policy based on the tag information that is available from the web content and from the auxiliary tag information that is identified by the kernel. When determining the policy, the kernel can determine whether the network data flow should be routed to a proxy 1130 or whether the network data flow can proceed with the server device 1140.

At step 1155, the kernel can create a connection to a proxy or server device via the socket 920. In the example shown in FIG. 9, it is determined that the network data flow should be routed to a proxy. Therefore, a connection to a proxy is established.

In the example shown in FIG. 11, the network data flow is routed to the proxy 1130 at step 1156. The proxy 1130 can include an anonymizer proxy and/or an encryption proxy.

At step 1157, the network data flow is routed from the proxy to the server device.

Accordingly, the kernel can provide added measures to ensure that confidential user information remains private and secure. And the kernel can identify auxiliary content metadata and/or can tag more information about web content. The kernel can tag more information by identifying the intent and content of the data that is sent on a network. This additional tagging can influence decisions about applying security policies. Therefore, example embodiments provide additional security and privacy transformations to data.

Instead of routing all traffic from a particular application a same way, the routing is performed on a per data (web content) basis. Data for a particular application (e.g., main content, secondary content) can be routed differently based on the type or category of data in the application. Data for web content that does not track user information can be routed differently from data for an application that tracks user information.

Therefore, all of the data from a single application may not be routed the same way. The routing that is performed for the web content in an application will vary based on the type or category of the data within the application. Example embodiments protect network data traffic that is being tracked or can be associated with sensitive information, such as user credential information.

The examples described above describe web content data, however, network data can include data other than web data.

As disclosed in example embodiments, the user's data does not leave the user's device without being screened and routed. Further, any sensitive data is sent to a proxy to ensure that the data is encrypted or anonymized before being sent to, for example, the Internet.

In the above description, for the purposes of explanation, specific details are set forth in order to provide a thorough understanding of the exemplary embodiments. However, it will be apparent that various embodiments may be practiced without these specific details. The figures and description are not intended to be restrictive.

III. Electronic Device

Figure 12:
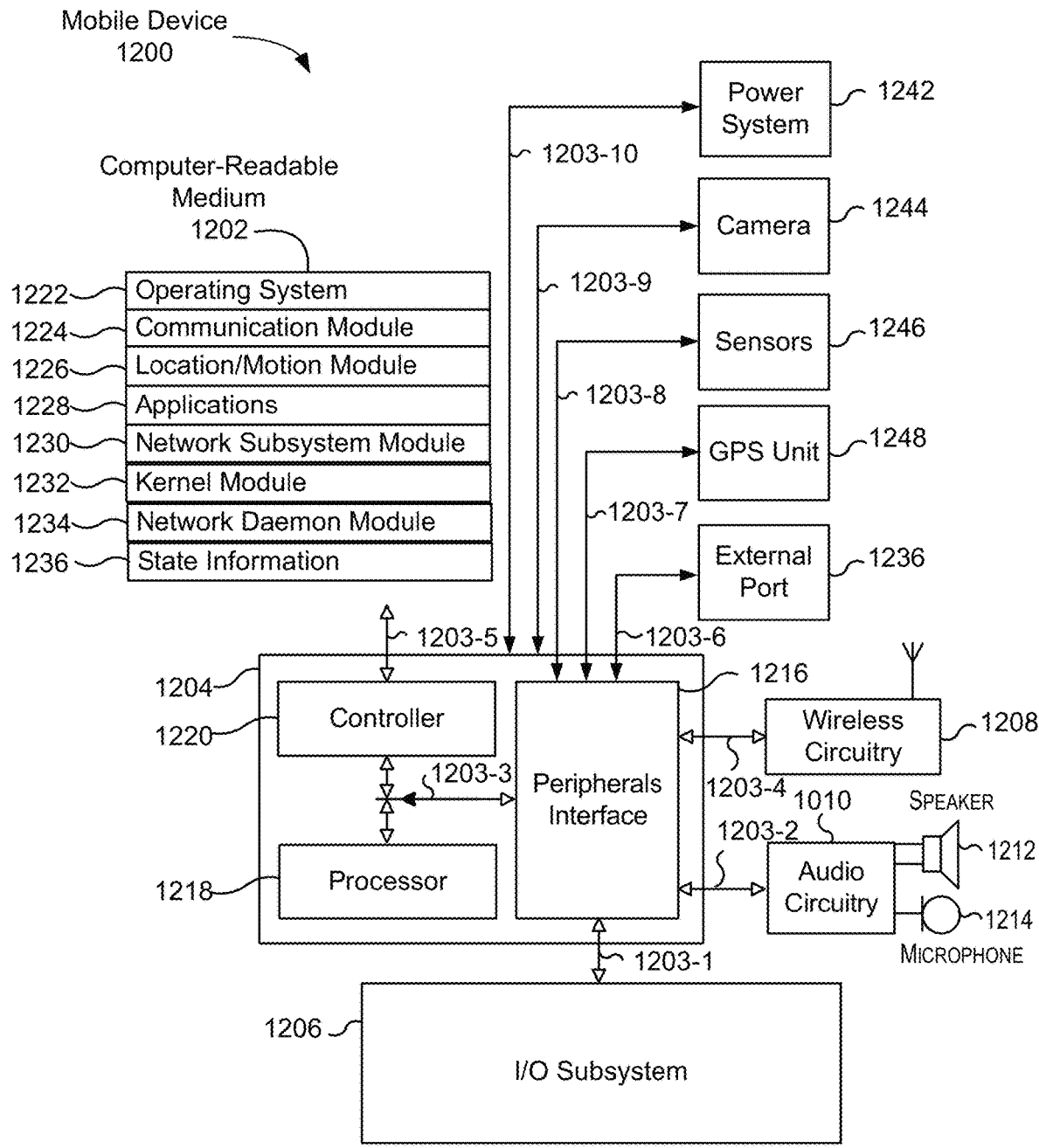
FIG. 12 illustrates a block diagram of an example device, in accordance with some embodiments.

FIG. 12 illustrates a block diagram of an example device 1200, in accordance with some embodiments. Device 1200 generally includes computer-readable medium 1202, a processing system 1204, an Input/Output (I/O) subsystem 1206, wireless circuitry 1208, and audio circuitry 1210 including speaker 1212 and microphone 1214. Computer-readable medium 1202 can be a non-transitory computer-readable medium. These components may be coupled by one or more communication buses or signal lines 1203 (e.g., 1203-1 to 1203-10). Device 1200 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items. Device 1200 can correspond to a controller device or an accessory device.

It should be apparent that the architecture shown in FIG. 12 is only one example of an architecture for device 1200, and that device 1200 can have more or fewer components than shown, or a different configuration of components. The various components shown in FIG. 12 can be implemented in hardware, software, or a combination of both hardware and software, including one or more signal processing and/or application specific integrated circuits.

Wireless circuitry 1208 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. In some embodiments, wireless circuitry 1208 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, WiFi (such as IEEE 802.11a, IEEE 802.11b, IEEE 802.11g and/or IEEE 802.11n), Bluetooth, Wi-MAX, voice over Internet Protocol (VoIP), near field communication protocol (NFC), a protocol for email, instant messaging, and/or a short message service (SMS), or any other suitable communication protocol, including communication protocols not yet developed as of the filing date of this document. A mobile device can include wireless circuitry that can communicate over several different types of wireless networks depending on the range required for the communication. For example, a short-range wireless transceiver (e.g., Bluetooth), a medium-range wireless transceiver (e.g., WiFi), and/or a long range wireless transceiver (e.g., GSM/GPRS, UMTS, CDMA2000 1x/EV-DO and LTE/LTE-Advanced) can be used depending on the type of communication or the range of the communication.

Wireless circuitry 1208 is coupled to processing system 1204 via peripherals interface 1216. Peripherals interface 1216 can include conventional components for establishing and maintaining communication between peripherals and processing system 1204. Voice and data information received by wireless circuitry 1208 (e.g., in speech recognition or voice command applications) is sent to one or more processors 1218 via peripherals interface 1216. One or more processors 1218 are configurable to process various data formats.

Peripherals interface 1216 couple the input and output peripherals of device 1200 to the one or more processors 1218 and computer-readable medium 1202. One or more processors 1218 communicate with computer-readable medium 1202 via a controller 1220. Computer-readable medium 1202 can be any device or medium that can store code and/or data for use by one or more processors 1218. Computer-readable medium 1202 can include a memory hierarchy, including cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). In some embodiments, peripherals interface 1216, one or more processors 1218, and controller 1220 can be implemented on a single chip, such as processing system 1204. In some other embodiments, they can be implemented on separate chips.

Processor(s) 1218 can include hardware and/or software elements that perform one or more processing functions, such as mathematical operations, logical operations, data manipulation operations, data transfer operations, controlling the reception of user input, controlling output of information to users, or the like. Processor(s) 1218 can be embodied as one or more hardware processors, microprocessors, microcontrollers, field programmable gate arrays (FPGAs), application-specified integrated circuits (ASICs), or the like.

Device 1200 also includes a power system 1242 for powering the various hardware components. Power system 1242 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1200 includes a camera 1244. In some embodiments, device 1200 includes sensors 1246. Sensors can include accelerometers, compass, gyrometer, pressure sensors, audio sensors, light sensors, barometers, and the like. Sensors 1246 can be used to sense location aspects, such as auditory or light signatures of a location. In some embodiments, device 1200 can include a GPS receiver, sometimes referred to as a GPS unit 1248. A mobile device can use a satellite navigation system, such as the Global Positioning System (GPS), to obtain position information, timing information, altitude, or other navigation information. In some embodiments, device 1200 can include external port 1236 (e.g., USB, FireWire, Lightning connector, 110-pin connector, etc.). External port 1236 can be adapted for coupling directly to other devices or indirectly over a network (e.g., the Internet, wireless LAN, etc.).

One or more processors 1218 run various software components stored in computer-readable medium 1202 to perform various functions for device 1200. In some embodiments, the software components include operating system 1222, communication module (or set of instructions) 1224, location and motion module 1226, other applications (computer products, sets of instructions, etc.) 1228, a network subsystem module 1230, a kernel module 1232 and a network daemon module 1234, Operating system 1222 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1224 facilitates communication with other devices over external port 1236 or via wireless circuitry 1208 and includes various software components for handling data received from wireless circuitry 1208 and/or external port 1236.

The one or more applications 1228 on device 1200 can include any applications installed on the device 1200, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

The state information 1236 can include a power state or mode of operation collected about one or more components of device 1200. State information 1236 can include a power state or mode of operation of components of other devices obtained by device 1200. As the mobile device or the companion device, device 1200 can generate local state information and remote state information in state information 1236. Device 1200 (e.g., using wireless circuitry 1208) can use state information 1236 to manage operations locally in order to reduce power usage. Device 1200 can synchronize all or part of the local state information in state information 1236 with the other devices. The other devices can delay sending messages to device 1200 allowing processors 1218 to remain in a sleep state further reducing power consumption.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 1206 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 1206 can include a display and user input devices such as a keyboard, mouse, and/or trackpad. In some embodiments, I/O subsystem 1206 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 1202) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1206 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1200 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

The foregoing description may make reference to specific examples of a mobile device (e.g., a wrist-worn device)

and/or a companion device (e.g., a smart phone). It is to be understood that these examples are illustrative and not limiting; other devices can be substituted and can implement similar functional blocks and/or algorithms to perform operations described herein and/or other operations.

Embodiments of the present invention, e.g., in methods, apparatus, computer-readable media and the like, can be realized using any combination of dedicated components and/or programmable processors and/or other programmable devices. The various processes described herein can be implemented on the same processor or different processors in any combination. As used herein, a processor includes a single-core processor, multi-core processor on a same integrated chip, or multiple processing units on a single circuit board or networked. Where components are described as being configured to perform certain operations, such configuration can be accomplished, e.g., by designing electronic circuits to perform the operation, by programming programmable electronic circuits (such as microprocessors) to perform the operation, or any combination thereof. Further, while the embodiments described above may make reference to specific hardware and software components, those skilled in the art will appreciate that different combinations of hardware and/or software components may also be used and that particular operations described as being implemented in hardware might also be implemented in software or vice versa.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Although specific example embodiments have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

As described above, one aspect of the present technology is the gathering and use of data available from specific and legitimate sources to improve the delivery to users of invitational content or any other content that may be of interest to them when updating firmware. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver targeted content that may be of greater interest to the user in accordance with their preferences. Accordingly, use of such personal information data enables users to have greater control of the delivered content. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely block the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users based on aggregated non-personal information data or a bare minimum amount of personal information, such as the content being handled only on the user's device or other non-personal information available to the content delivery services.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, suggested customizations can be selected and delivered to users by inferring preferences based on non-personal information data or a bare minimum amount of personal information, such as the content being requested by the device associated with a user, other non-personal information available to the avatar application, or publicly available information.

Further, while example embodiments have been described using a particular combination of hardware and software, it should be recognized that other combinations of hardware and software are also within the scope of the example embodiments. Some of the example embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific example embodiments have been described, these are not intended to be limiting. Various modifications and equivalents are within the scope of the following claims.

All patents, patent applications, publications, and descriptions mentioned herein are incorporated by reference in their entirety for all purposes. None is admitted to be prior art.

What is claimed is:

1. A method for processing data by a computing device, the method comprising:

receiving, by a network routine executing in a kernel of the computing device, network data comprising a first payload and first metadata, from a first application executing on the computing device, wherein the first metadata includes (1) first address data specifying a destination device to which the network data is to be sent over a network and (2) first content metadata describing first application data that triggered a first request to send the network data;

determining, by the network routine, a first policy associated with the first content metadata, the first policy specifying a first security protocol for sending the first payload to the destination device, wherein determining the first policy associated with the first content metadata comprises determining a tag for the first content metadata, and wherein the first policy is based at least in part on the tag in the first content metadata;

establishing a first network connection for transmitting, between the first application and the destination device, the network data that matches the first policy, wherein the first network connection corresponds to the first security protocol; and routing, by the network routine in the kernel, the first payload to the destination device using the first network connection.

2. The method according to claim 1, further comprising:
receiving, by the network routine, network data comprising a second payload and second metadata, from a second application executing on the computing device, wherein the second metadata includes (1) second address data specifying a second destination device to which the network data is to be sent over the network and (2) second content metadata describing second application data that triggered a second request to send the network data;
determining, by the network routine, a second policy associated with the second content metadata, the second policy specifying a second security protocol for sending the second payload to the second destination device; and
establishing a second network connection for transmitting, between the second application and the second destination device, the network data that matches the second policy, wherein the second network connection is configured to use the second security protocol; and
routing, by the network routine in the kernel, the second payload to the second destination device using the second network connection.

3. The method according to claim 1, wherein the first security protocol comprises an encryption protocol or a double proxy protocol.

4. The method according to claim 1, wherein the first content metadata specifies a location for displaying the network data on a screen of the computing device.

5. The method according to claim 1, wherein the first content metadata identifies an intent or a context of the network data, wherein the intent identifies a purpose of the network data, and wherein the context identifies an environment or background information associated with the network data.

6. The method according to claim 2, wherein the first application comprises main content for a web page and secondary content for the web page.

7. The method according to claim 1, wherein determining, by the network routine, the first policy associated with the first content metadata further comprises
determining, by the network routine, that the first policy is to be associated with the first content metadata based on the determined tag.

8. The method according to claim 7, wherein the network routine determines the tag for the first content metadata by obtaining the tag from the first application.

9. The method according to claim 7, wherein the network routine determines the tag for the first content metadata by:
determining auxiliary content metadata from the first application; and
assigning the tag based on the determined auxiliary content metadata.

10. The method according to claim 7, wherein the tag comprises an advertisement tag, an email tag, a medical information tag, a country tag, and an arbitrary application tag.

11. A computing device comprising:
one or more processors and a memory, wherein the one or more processors are configured to perform a method comprising
receiving, by a network routine executing in a kernel of the computing device, network data comprising a first payload and first metadata, from a first application executing on the computing device, wherein the first metadata includes (1) first address data specifying a destination device to which the network data is to be sent over a network and (2) first content metadata describing first application data that triggered a first request to send the network data;
determining, by the network routine, a first policy associated with the first content metadata, the first policy specifying a first security protocol for sending the first payload to the destination device,
wherein determining the first policy associated with the first content metadata comprises determining a tag for the first content metadata,
wherein the first policy is based at least in part on the tag in the first content metadata;
establishing a first network connection for transmitting, between the first application and the destination device, the network data that matches the first policy, wherein the first network connection corresponds to the first security protocol; and
routing, by the network routine in the kernel, the first payload to the destination device using the first network connection.

12. The computing device according to claim 11, wherein the one or more processors are configured to perform the method further comprising:
receiving, by the network routine, network data comprising a second payload and second metadata, from a second application executing on the computing device, wherein the second metadata includes (1) second address data specifying a second destination device to which the network data is to be sent over the network and (2) second content metadata describing second application data that triggered a second request to send the network data;
determining, by the network routine, a second policy associated with the second content metadata, the second policy specifying a second security protocol for sending the second payload to the second destination device; and
establishing a second network connection for transmitting, between the second application and the second destination device, the network data that matches the second policy, wherein the second network connection is configured to use the second security protocol; and
routing, by the network routine in the kernel, the second payload to the second destination device using the second network connection.

13. The computing device according to claim 11, wherein the first security protocol comprises an encryption protocol or a double proxy protocol.

14. The computing device according to claim 11, wherein the first content metadata specifies a location for displaying the network data on a screen of the computing device.

15. The computing device according to claim 11, wherein the first content metadata identifies an intent or a context of the network data, wherein the intent identifies a purpose of the network data, and wherein the context identifies an environment or background information associated with the network data.

16. A non-transitory computer readable medium including instructions configured to cause one or more processors to perform operations comprising:
receiving, by a network routine executing in a kernel of a computing device, network data comprising a first payload and first metadata, from a first application executing on the computing device, wherein the first metadata includes (1) first address data specifying a destination device to which the network data is to be sent over a network and (2) first content metadata describing first application data that triggered a first request to send the network data;

determining, by the network routine, a first policy associated with the first content metadata, the first policy specifying a first security protocol for sending the first payload to the destination device, wherein determining the first policy associated with the first content metadata comprises determining a tag for the first content metadata, wherein the first policy is based at least in part on the tag in the first content metadata;

establishing a first network connection for transmitting, between the first application and the destination device, the network data that matches the first policy, wherein the first network connection corresponds to the first security protocol; and routing, by the network routine in the kernel, the first payload to the destination device using the first network connection.

17. The computer readable medium according to claim 16, further comprising instructions configured to cause the one or more processors to perform operations comprising:

receiving, by the network routine, network data comprising a second payload and second metadata, from a second application executing on the computing device, wherein the second metadata includes (1) second address data specifying a second destination device to which the network data is to be sent over the network and (2) second content metadata describing second application data that triggered a second request to send the network data;

determining, by the network routine, a second policy associated with the second content metadata, the second policy specifying a second security protocol for sending the second payload to the second destination device; and establishing a second network connection for transmitting, between the second application and the second destination device, the network data that matches the second policy, wherein the second network connection is configured to use the second security protocol; and routing, by the network routine in the kernel, the second payload to the second destination device using the second network connection.

18. The computer readable medium according to claim 16, wherein the first security protocol comprises an encryption protocol or a double proxy protocol.

19. The computer readable medium according to claim 16, wherein the first content metadata specifies a location for displaying the network data on a screen of the computing device.

20. The computer readable medium according to claim 16, wherein the first content metadata identifies an intent or a context of the network data, wherein the intent identifies a purpose of the network data, and wherein the context identifies an environment or background information associated with the network data.

* * * * *